US011086165B2

(12) United States Patent
Bae et al.

(10) Patent No.: US 11,086,165 B2
(45) Date of Patent: Aug. 10, 2021

(54) DISPLAY APPARATUS AND METHOD OF FABRICATING THE SAME

(71) Applicant: Samsung Display Co., Ltd., Yongin-Si (KR)

(72) Inventors: Kwangsoo Bae, Suwon-si (KR); Jungsuk Bang, Seoul (KR); Junho Song, Seongnam-si (KR); Minjeong Oh, Gimpo-si (KR); Haeju Yun, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 87 days.

(21) Appl. No.: 15/679,500

(22) Filed: Aug. 17, 2017

(65) Prior Publication Data

US 2018/0052365 A1 Feb. 22, 2018

(30) Foreign Application Priority Data

Aug. 19, 2016 (KR) .................. 10-2016-0105650
Jun. 15, 2017 (KR) .................. 10-2017-0076054

(51) Int. Cl.
*G02F 1/13357* (2006.01)
*G02F 1/1333* (2006.01)
(Continued)

(52) U.S. Cl.
CPC ...... *G02F 1/133615* (2013.01); *G02F 1/1341* (2013.01); *G02F 1/1362* (2013.01); *G02F 1/133377* (2013.01); *G02F 1/133626* (2021.01)

(58) Field of Classification Search
CPC ......... G02F 1/133615; G02F 1/133377; G02F 1/1341
See application file for complete search history.

(56) References Cited

U.S. PATENT DOCUMENTS 5,594,571 A * 1/1997 Hanyu .................. G02F 1/1337
349/124
5,631,754 A * 5/1997 Jannson .................. G02B 5/32
349/130
(Continued)

FOREIGN PATENT DOCUMENTS

CN 104076554 A 10/2014
CN 104570510 A 4/2015
(Continued)

OTHER PUBLICATIONS

Lee, et al., "Polarizer-free liquid crystal display with double microlens array layers and polarization-controlling liquid crystal layer", Optics Express, vol. 23, No. 21, Oct. 19, 2015, pp. 27627-27632.

*Primary Examiner* — Lucy P Chien
(74) *Attorney, Agent, or Firm* — Cantor Colburn LLP

(57) ABSTRACT

A display apparatus includes a first substrate in which a plurality of pixel areas and a non-pixel area around the pixel areas are defined, a cavity-defining layer disposed on the first substrate and defining a plurality of cavities corresponding to the pixel areas, an insulating layer disposed on the cavity-defining layer and in the cavities, a liquid crystal layer disposed on the insulating layer in the cavities, and a second substrate disposed on the insulating layer to cover the liquid crystal layer. The liquid crystal layer has a same refractive index as the cavity-defining layer when the liquid crystal layer is not driven. The liquid crystal layer has a greater refractive index than the cavity-defining layer when the liquid crystal layer is driven.

20 Claims, 18 Drawing Sheets

(51) Int. Cl.
  *G02F 1/1341* (2006.01)
  *G02F 1/1362* (2006.01)
  *G02F 1/1335* (2006.01)

(56) References Cited

U.S. PATENT DOCUMENTS

| | | | |
|---|---|---|---|
| 5,978,062 A * | 11/1999 | Liang | G02F 1/133371 |
| | | | 349/132 |
| 6,201,592 B1 * | 3/2001 | Terashita | G02F 1/1337 |
| | | | 349/156 |
| 6,244,719 B1 * | 6/2001 | Oda | G02B 6/0036 |
| | | | 362/23.15 |
| 6,682,783 B1 * | 1/2004 | Tomioka | G02F 1/1337 |
| | | | 349/123 |
| 8,237,888 B2 | 8/2012 | Okuyama et al. | |
| 9,140,944 B2 | 9/2015 | Cho et al. | |
| 9,298,029 B2 | 3/2016 | Choi et al. | |
| 9,377,649 B2 | 6/2016 | Choi et al. | |
| 9,645,443 B2 | 5/2017 | Fukunaga et al. | |
| 9,759,943 B2 | 9/2017 | Kim et al. | |
| 2008/0246895 A1 * | 10/2008 | Kuwata | G02F 1/1334 |
| | | | 349/5 |
| 2010/0208497 A1 | 8/2010 | Song et al. | |
| 2012/0268438 A1 | 10/2012 | Lee | |
| 2014/0160395 A1 | 6/2014 | Park et al. | |
| 2016/0170132 A1 | 6/2016 | Sugimoto | |

FOREIGN PATENT DOCUMENTS

| | | |
|---|---|---|
| JP | 10232398 A | 9/1998 |
| JP | 11513814 A | 11/1999 |
| JP | 2008256989 A | 10/2008 |
| JP | 201092682 A | 4/2010 |
| KR | 1019990082166 A | 11/1999 |
| KR | 1020100094851 A | 8/2010 |
| KR | 1020120045968 A | 5/2012 |
| KR | 1020120088041 A | 8/2012 |
| KR | 1020120120554 A | 11/2012 |
| KR | 1020140048731 A | 4/2014 |
| KR | 1020140075979 A | 6/2014 |
| KR | 1020150076880 A | 7/2015 |
| KR | 1020150083684 A | 7/2015 |

* cited by examiner

[WHITE MODE]

DISPLAY APPARATUS AND METHOD OF FABRICATING THE SAME

This application claims priority to Korean Patent Application No. 10-2016-0105650, filed on Aug. 19, 2016, and Korean Patent Application No. 10-2017-0076054, filed on Jun. 15, 2017, and all the benefits accruing therefrom under 35 U.S.C. § 119, the contents of which in their entireties are herein incorporated by reference.

BACKGROUND

1. Field

Embodiments of the invention relate to a display apparatus and a method of fabricating the display apparatus, and, more particularly, to a display apparatus with improved light-emitting efficiency and of reduced thickness, and a method of fabricating the display apparatus.

2. Description of the Related Art

Generally, a display apparatus typically includes a display panel for displaying an image by using light, and a backlight unit for generating the light and providing the light to the display panel. The display panel may include a first substrate on which a plurality of pixels is disposed, a second substrate facing the first substrate, and an image display layer disposed between the first and second substrates. The backlight unit may be an edge-type backlight unit which is disposed near a side portion of the display apparatus to generate light.

The image display layer may be driven by the pixels, and a transmittance of light provided from the backlight unit to the display panel may be controlled by the image display layer to display an image. The image display layer may be a liquid crystal layer, an electrowetting layer, or an electrophoretic layer, for example.

The edge-type backlight unit typically includes a light source for generating light, a light guide plate for guiding the light provided from the light source in an upper direction toward the display panel, and an optical sheet disposed between the light guide plate and the display panel. The optical sheet may condense light, provided from the light guide plate, in the upper direction. In such an edge-type backlight unit, the optical sheet may provide the condensed light to the display panel. In such a display apparatus, polarizing plates which polarize light may be provided on and under the display panel.

SUMMARY

In a display apparatus, a total thickness thereof may be substantially thick due to the optical sheet and the polarizing plates. In such a display apparatus, when light is transmitted through the optical sheet and the polarizing plates, a loss of the light may occur by the optical sheet and the polarizing plates to deteriorate light-emitting efficiency of the display apparatus.

Embodiments of the invention may provide a display apparatus with improved light-emitting efficiency and reduced thickness, and a method of fabricating the display apparatus.

In an embodiment of the invention, a display apparatus includes a first substrate, in which a plurality of pixel areas and a non-pixel area around the pixel areas are defined, a cavity-defining layer disposed on the first substrate and which defines a plurality of cavities corresponding to the pixel areas, an insulating layer disposed on the cavity-defining layer and in the cavities, a liquid crystal layer disposed on the insulating layer in the cavities, and a second substrate disposed on the insulating layer to cover the liquid crystal layer. In such an embodiment, a refractive index of the liquid crystal layer is equal to a refractive index of the cavity-defining layer when the liquid crystal layer is not driven. In such an embodiment, the refractive index of the liquid crystal layer is greater than the refractive index of the cavity-defining layer when the liquid crystal layer is driven.

In an embodiment of the invention, a display apparatus includes a display panel, and a shutter panel providing light to the display panel. In such an embodiment, the shutter panel includes a first substrate, in which a plurality of pixel areas and a non-pixel area around the pixel areas are defined, a light source spaced apart from a side surface of the first substrate by a predetermined distance and which provides light to the first substrate, a cavity-defining layer disposed on the first substrate and which defines a plurality of cavities corresponding to the pixel areas, an insulating layer disposed on the cavity-defining layer and in the cavities, a liquid crystal layer disposed on the insulating layer in the cavities, and a second substrate disposed on the insulating layer to cover the liquid crystal layer. In such an embodiment, a refractive index of the liquid crystal layer is equal to a refractive index of the cavity-defining layer when the liquid crystal layer is not driven. In such an embodiment, the refractive index of the liquid crystal layer is greater than the refractive index of the cavity-defining layer when the liquid crystal layer is driven.

In an embodiment of the invention, a method of fabricating a display apparatus includes preparing a first substrate including a plurality of pixel electrodes disposed in a plurality of pixel areas and a plurality of transistors disposed in a non-pixel area around the pixel areas and connected to the pixel electrodes, providing a cavity-defining layer which defines a plurality of cavities corresponding to the pixel areas on the first substrate, providing an insulating layer on the cavity-defining layer in the cavities, providing a liquid crystal layer on the insulating layer in the cavities, and providing a second substrate on the insulating layer to cover the liquid crystal layer. In such an embodiment, the second substrate includes a common electrode facing the pixel electrodes. In such an embodiment, a refractive index of the liquid crystal layer is equal to a refractive index of the cavity-defining layer when the liquid crystal layer is not driven. In such an embodiment, the refractive index of the liquid crystal layer is greater than the refractive index of the cavity-defining layer when the liquid crystal layer is driven.

In an embodiment of the invention, a display apparatus includes a first substrate in which a plurality of pixel areas and a non-pixel area around the pixel areas are defined, a cavity-defining layer disposed on the first substrate and which defines a plurality of cavities corresponding to the pixel areas, a liquid crystal layer disposed in the cavities, and a second substrate disposed on the cavity-defining layer to cover the liquid crystal layer. In such an embodiment, the liquid crystal layer has a same refractive index as the cavity-defining layer when the liquid crystal layer is not driven. In such an embodiment, the liquid crystal layer has a greater refractive index than the cavity-defining layer when the liquid crystal layer is driven. In such an embodiment, each of the cavities has a cylindrical shape, and a diameter of each of the cavities becomes progressively greater from a bottom thereof toward a top thereof. In such an embodiment, a cross section of each of the cavities has an inverted trapezoidal shape.

BRIEF DESCRIPTION OF THE DRAWINGS

The above and other aspects and features of the present invention will become more apparent by describing in further detail exemplary embodiments thereof with reference to the accompanying drawings, in which.

DETAILED DESCRIPTION

Figure 1:
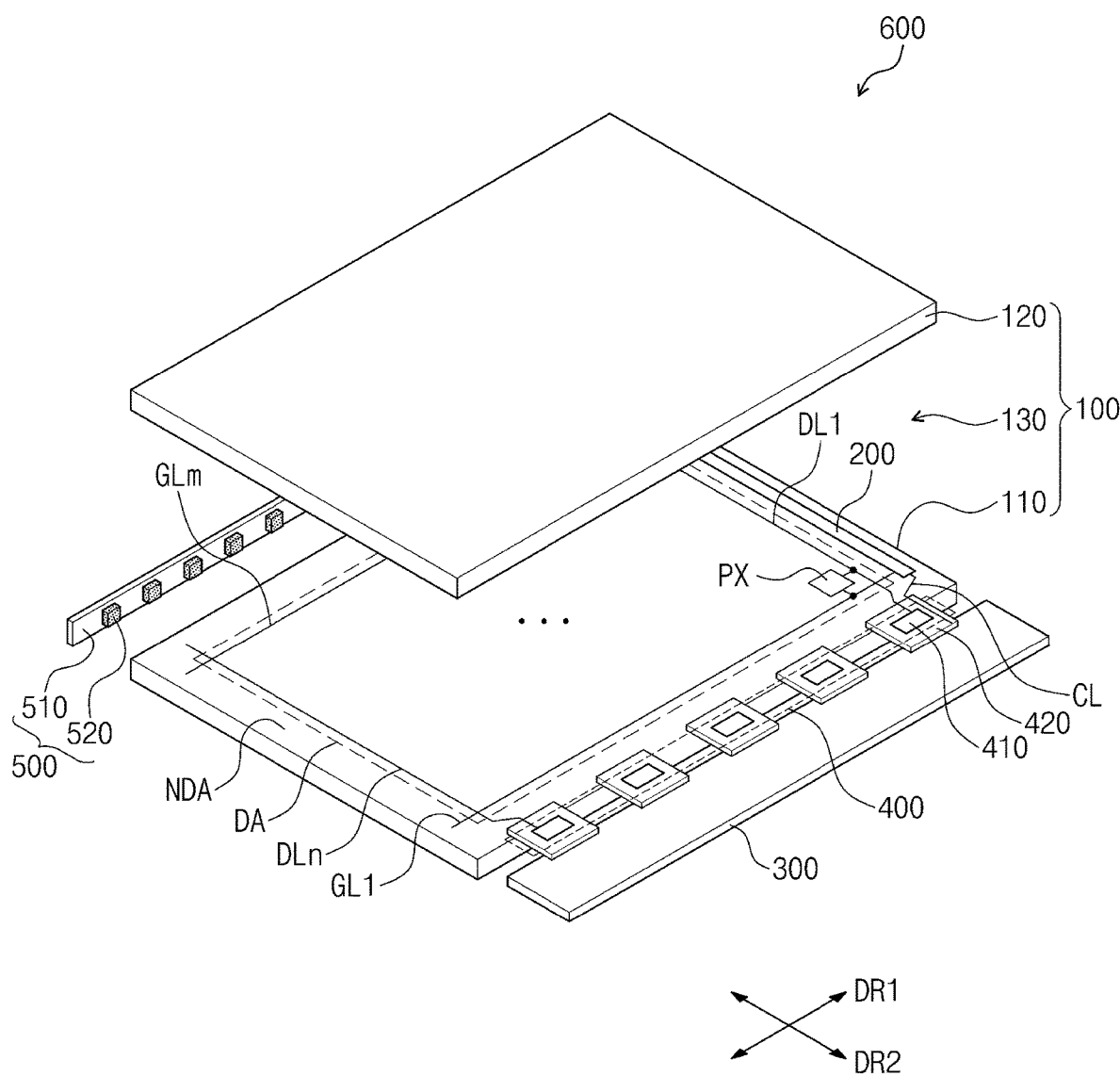
FIG. 1 is an exploded perspective view illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of exemplary embodiments.

Hereinafter, exemplary embodiments of the invention will be described in detail with reference to the accompanying drawings.

FIG. 1 is an exploded perspective view illustrating a display apparatus according to an embodiment of the invention.

Referring to FIG. 1, an embodiment of a display apparatus 600 includes a display panel 100, a gate driver 200, a printed circuit board 300, a data driver 400, and a light source 500.

The display panel 100 may have a long side parallel to a first direction DR1 and may have a short side parallel to a second direction DR2 intersecting the first direction DR1. The light source 500 generates light and provides the generated light to the display panel 100. The display panel 100 displays an image by using the light provided from the light source 500.

The display panel 100 includes a first substrate 110, a second substrate 120 facing the first substrate 110, and an image display layer 130 disposed between the first substrate 110 and the second substrate 120. The second substrate 120 may be disposed over the first substrate 110. The first and second substrates 110 and 120 may include glass.

A plurality of pixels PX, a plurality of gate lines GL1 to GLm, and a plurality of data lines DL1 to DLn are disposed on the first substrate 110. Here, 'm' and 'n' are natural numbers. In FIG. 1, only one pixel PX is illustrated for the purpose of ease and convenience in description and illustration, but not being limited thereto. In such an embodiment, a plurality of pixels PX may be disposed on the first substrate 110.

The gate lines GL1 to GLm are insulated from the data lines DL1 to DLn and intersect the data lines DL1 to DLn. The gate lines GL1 to GLm extend in the first direction DR1 to be connected to the gate driver 200. The data lines DL1 to DLn extend in the second direction DR2 to be connected to the data driver 400.

The pixels PX are disposed in areas defined by the gate lines GL1 to GLm and the data lines DL1 to DLn intersecting the gate lines GL1 to GLm. The pixels PX are arranged substantially in a matrix form and are connected to the gate lines GL1 to GLm and the data lines DL1 to DLn.

The gate driver 200 is disposed in a predetermined area of the first substrate 110, which is close to a side of the first substrate 110 in the first direction DR1. The gate driver 200 may be provide or formed simultaneously with transistors of the pixels PX by a same processes and may be mounted on the first substrate 110 in an amorphous silicon thin film transistor ("TFT" gate driver circuit ("ASG") form or an oxide silicon TFT gate driver circuit ("OSG") form.

However, embodiments of the invention are not limited thereto. In an alternative embodiment, the gate driver 200 may be formed in a tape carrier package ("TCP") type to be connected to the first substrate 110. The TCP may include a flexible printed circuit board and a plurality of driving chips mounted on the flexible printed circuit board. Alternatively, the gate driver 200 may include a plurality of driving chips, and may be mounted on the first substrate 110 in a chip-on-glass ("COG") type.

A timing controller (not shown) is disposed on the printed circuit board 300. The timing controller may be mounted in an integrated circuit chip type on the printed circuit board 300 to be connected to the gate driver 200 and the data driving unit 400. The timing controller outputs a gate control signal, a data control signal, and image data.

The gate driver 200 receives the gate control signal from the timing controller through a control line CL. The gate driver 200 may generate a plurality of gate signals based on the gate control signal, and may sequentially output the gate signals to the gate lines GL1 to GLm. The gate signals are provided to the pixels PX, arranged in the unit of row corresponding to the first direction DR1, through the gate lines GL1 to GLm. Thus, the pixels PX may be driven in the unit of row or on a row-by-row basis.

The data driver 400 includes a plurality of source driving chips 410. The source driving chips 410 are disposed or mounted on flexible circuit boards 420, and are connected to the printed circuit board 300 and a predetermined area of the first substrate 110 adjacent to a side of the first substrate 110 in the second direction DR2. In such an embodiment, the data driver 400 is connected to the first substrate 110 and the printed circuit board 300 in a TCP type. However, embodiments of the invention are not limited thereto. In an alternative embodiment, the source driving chips 410 of the data driver 400 may be mounted on the first substrate 110 in a COG type.

The data driver 400 receives the image data and the data control signal from the timing controller. The data driver 400 generates and outputs analog data voltages corresponding to the image data in response to the data control signal. The data voltages are provided to the pixels PX through the data lines DL1 to DLn.

The pixels PX receive the data voltages through the data lines DL1 to DLn in response to the gate signals provided through the gate lines GL1 to GLm. The pixels PX may display gray scales corresponding to the data voltages, thereby displaying an image.

In an embodiment, the image display layer 130 may include a liquid crystal layer. However, embodiments of the invention are not limited thereto. In an alternative embodiment, the image display layer 130 may include an electrowetting layer or an electrophoretic layer. In such an embodiment, when the pixels PX are not driven, the image display layer 130 may inhibit or prevent light provided through the first substrate 110 from being emitted or outputted upward. When the pixels PX are driven by the gate signals and the data voltages, the image display layer 130 may emit or output the light provided through the first substrate 110 in an upward direction, thereby displaying an image. The image display layer 130 will be described later in greater detail with reference to FIG. 3.

The light source 500 may extend in the first direction DR1 and may be disposed close to a side surface of the first substrate 110 in the second direction DR2. The light generate from the light source 500 may be provided to the first substrate 110, and the light provided to the first substrate 110 may be guided in an upper direction.

The light source 500 includes a light source substrate 510 extending in the first direction DR1 and a plurality of light source units 520 disposed or mounted on the light source substrate 510. The light source units 520 may be arranged to be spaced apart from each other with constant interval in the first direction DR1. The light source units 520 are disposed to face the side surface of the first substrate 110 in the second direction DR2. The light source units 520 generate light, and the light generated from the light source units 520 is provided to the side surface of the first substrate 110.

Figure 2:
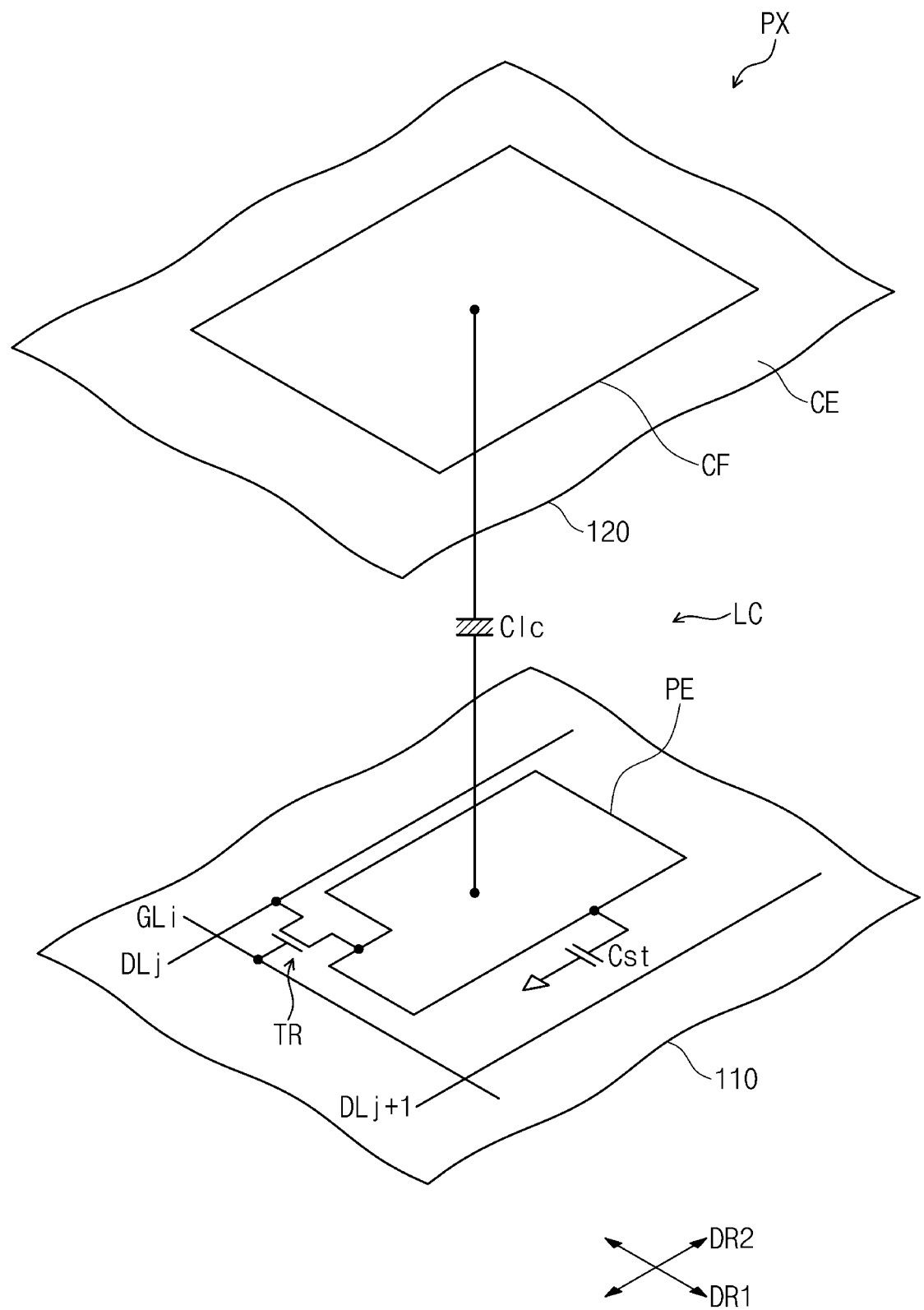
FIG. 2 is an equivalent circuit diagram illustrating a pixel of FIG. 1.

FIG. 2 is an equivalent circuit diagram illustrating a pixel of FIG. 1.

For the purpose of ease and convenience in description and illustration, FIG. 2 shows a transistor TR of a pixel PX connected to a gate line GLi and a data line DLj and a liquid crystal layer LC (i.e., the image display layer) driven by the transistor TR. Even though not shown in the drawings, elements of each of other pixels PX of the display panel 100 may be the same as those of the pixel PX illustrated in FIG. 2.

Referring to FIG. 2, a pixel PX includes the transistor TR connected to a corresponding gate line, e.g., an i-th gate line GLi, and a corresponding data line, e.g., a j-th data line DLj, a liquid crystal capacitor Clc connected to the transistor TR, and a storage capacitor Cst connected in parallel to the liquid crystal capacitor Clc. In an alternative embodiment, the storage capacitor Cst may be omitted. Here, 'i' and 'j' are natural numbers.

The transistor TR may be disposed on the first substrate 110. The transistor TR includes a gate electrode connected to the corresponding gate line GLi, a source electrode connected to the corresponding data line DLj, and a drain electrode connected to the liquid crystal capacitor Clc and the storage capacitor Cst.

The liquid crystal capacitor Clc includes a pixel electrode PE disposed on the first substrate 110, a common electrode CE disposed on the second substrate 120, and the liquid crystal layer LC disposed between the pixel electrode PE and the common electrode CE. The liquid crystal layer LC may function as a dielectric material of a capacitor. The pixel electrode PE is connected to the drain electrode of the transistor TR.

The pixel electrode PE may include or be formed of a transparent conductive material. In one embodiment, for example, the pixel electrode PE may include the transparent conductive material such as indium-tin oxide ("ITO"), indium-zinc oxide ("IZO"), or indium-tin-zinc oxide ("ITZO"). In an embodiment, as shown in FIG. 2, the pixel electrode PE may have a non-slit structure. However, embodiments of the invention are not limited thereto. In an alternative embodiment, the pixel electrode PE may have a slit structure that includes a cross-shaped stem portion and a plurality of branch portions radially extending from the stem portion.

In an embodiment, the common electrode CE may be disposed to cover a substantially entire portion of the second substrate 120. However, embodiments of the invention are not limited thereto. In an alternative embodiment, the common electrode CE may be disposed on the first substrate 110. In such an embodiment, at least one of the pixel electrode PE or the common electrode CE may include a slit. The common electrode CE may include or be formed of a transparent conductive material. In one embodiment, for example, the common electrode CE may include the transparent conductive material such as ITO, IZO, or ITZO.

The storage capacitor Cst may include the pixel electrode PE, a storage electrode (not shown) branched from a storage line (not shown), and an insulating layer disposed between the pixel electrode PE and the storage electrode. The storage line may be disposed on the first substrate 110 and may be provided or formed simultaneously with the gate lines GL1 to GLm in a same layer. The storage electrode may partially overlap with the pixel electrode PE.

The pixel PX may further include a color filter CF showing one of a red color, a green color, and a blue color. In one embodiment, for example, the color filter CF may be disposed on the second substrate 120, as illustrated in FIG. 2. However, embodiments of the invention are not limited thereto. In an alternative embodiment, the color filter CF may be disposed on the first substrate 110.

The transistor TR is turned-on in response to the gate signal provided through the gate line GLi. The data voltage received through the data line DLj is provided to the pixel electrode PE of the liquid crystal capacitor Clc through the transistor TR which is turned-on. A common voltage is applied to the common electrode CE.

An electric field is generated between the pixel electrode PE and the common electrode CE by a difference in voltage level between the data voltage and the common voltage. Liquid crystal molecules of the liquid crystal layer LC are driven by the electric field generated between the pixel electrode PE and the common electrode CE. A light transmittance may be adjusted or controlled by the liquid crystal molecules driven by the electric field, thereby displaying an image.

In an embodiment, a storage voltage having a constant voltage level may be applied to the storage line. However, embodiments of the invention are not limited thereto. In an alternative embodiment, the common voltage may be applied to the storage line. The storage capacitor Cst may supplement a voltage charged in the liquid crystal capacitor Clc.

Figure 3:
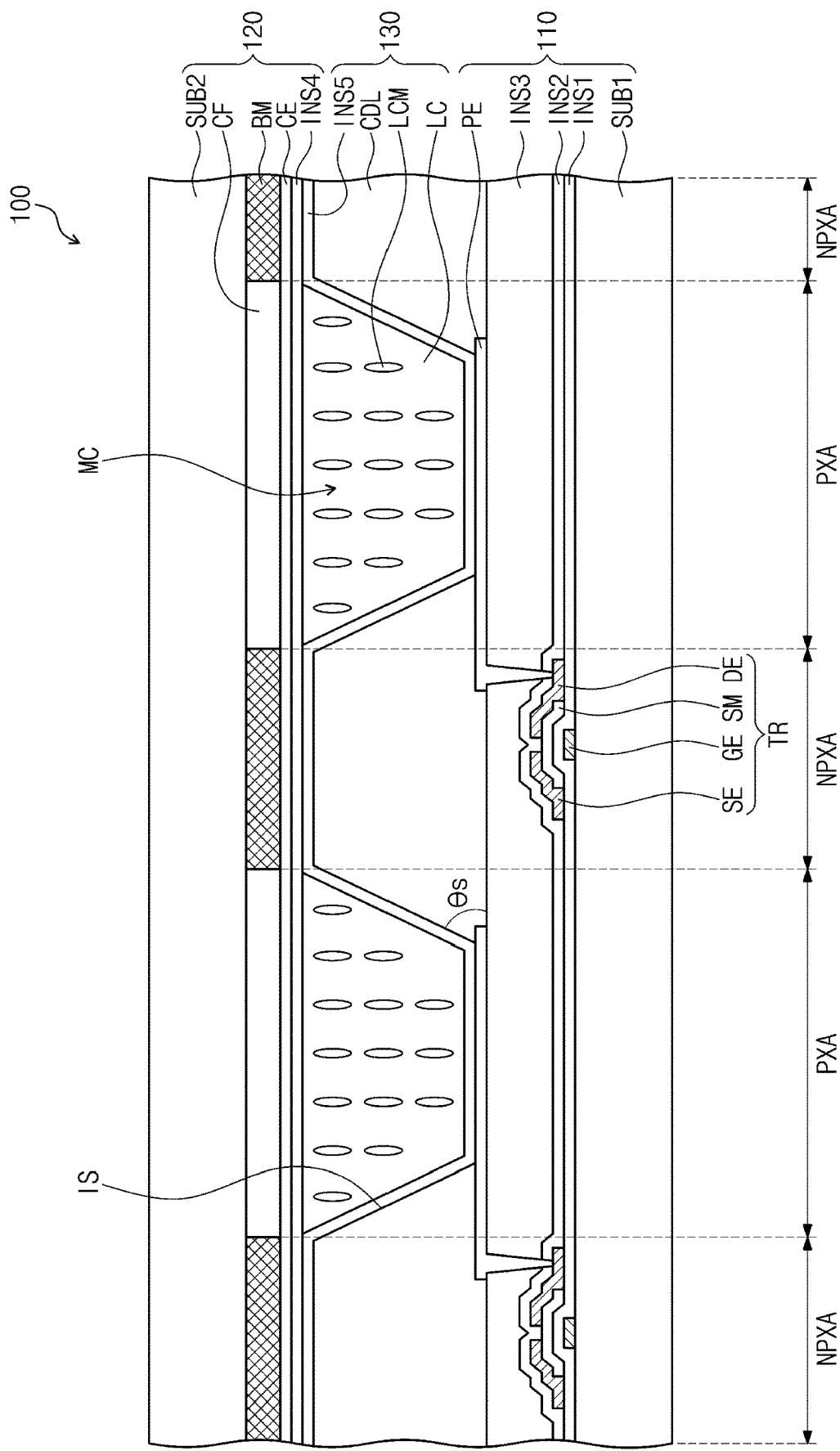
FIG. 3 is a cross-sectional view illustrating a partial region of a display panel of FIG. 1.
Figure 4:
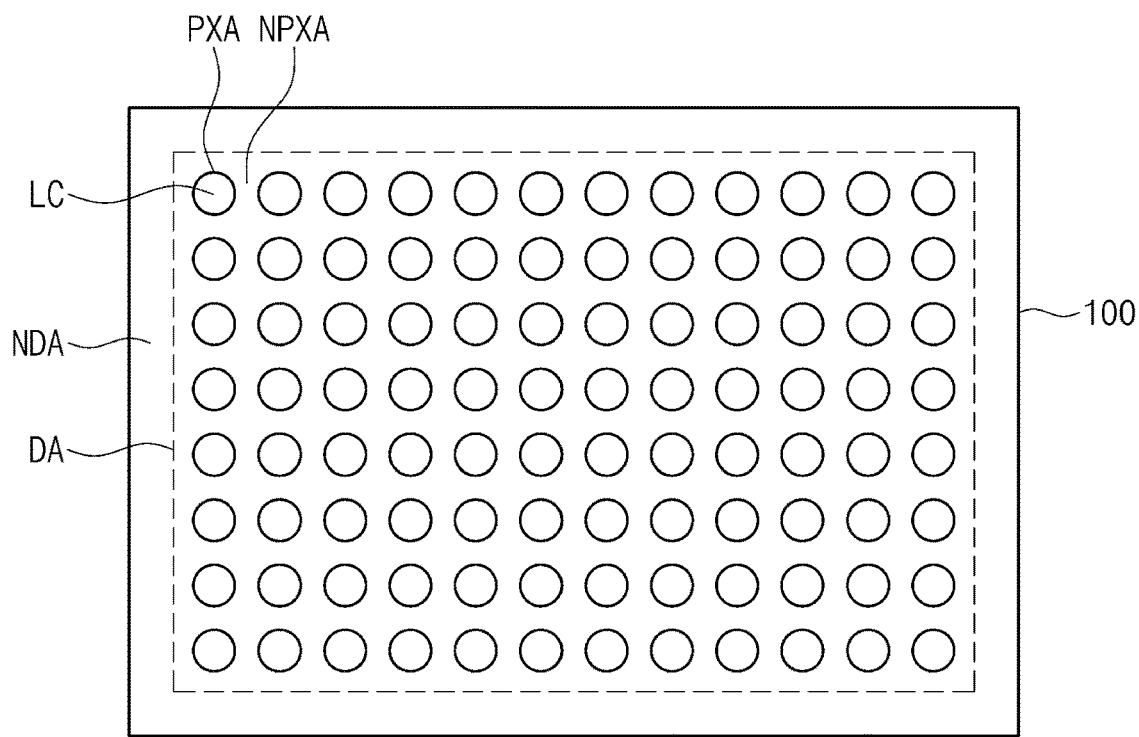
FIG. 4 is a plan view illustrating the display panel including pixel areas of FIG. 3.
Figure 5:
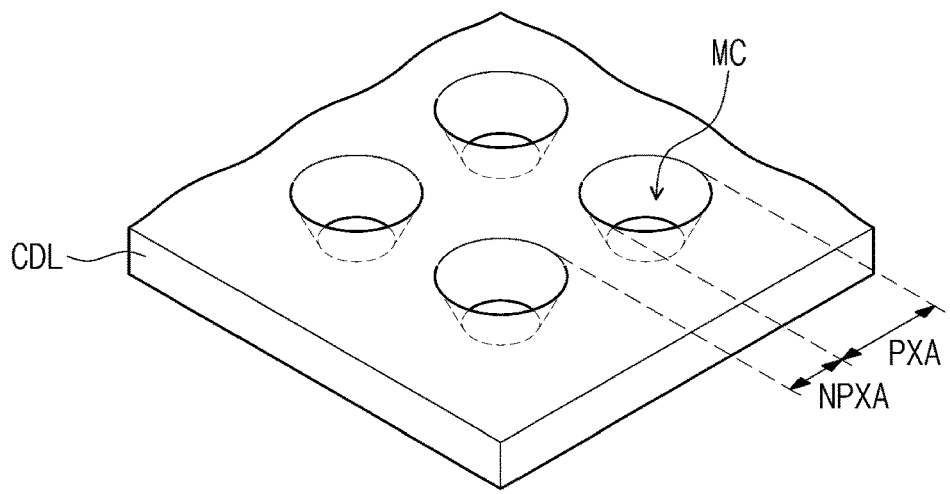
FIG. 5 is a perspective view illustrating a cavity-defining layer that defines cavities of FIG. 3.

FIG. 3 is a cross-sectional view illustrating a partial region of a display panel of FIG. 1. FIG. 4 is a plan view illustrating the display panel including pixel areas of FIG. 3. FIG. 5 is a perspective view illustrating a cavity-defining layer defining cavities of FIG. 3.

For the purpose of ease and convenience in description and illustration, FIG. 4 illustrates a planar area of the display panel 100 and FIG. 5 illustrates only a cavity-defining layer CDL defining cavities MC.

Referring to FIGS. 3, 4 and 5, the first substrate 110 includes a first base substrate SUB1, the transistors TR disposed on the first base substrate SUB1, and the pixel electrodes PE connected to the transistors TR. A planar area of each of the pixels PX of a display area DA includes a pixel area PXA and a non-pixel area NPXA disposed around the pixel area PXA.

The transistors TR are disposed in the non-pixel area NPXA. Each of the transistors TR includes a gate electrode GE, a semiconductor layer SM, a source electrode SE and a drain electrode DE. The gate electrode GE of each of the transistors TR is disposed on the first base substrate SUB1. The first base substrate SUB1 may include a glass. The gate electrode GE of each of the transistors TR is connected to a corresponding one of the gate lines GL1 to GLm.

A first insulating layer INS1 is disposed on the first base substrate SUB1 and covers the gate electrodes GE. The first insulating layer INS1 may be an inorganic insulating layer including an inorganic material. In one embodiment, for example, the first insulating layer INS1 may include an inorganic insulating material such as silicon nitride and/or silicon oxide.

The semiconductor layer SM of each of the transistors TR is disposed on the first insulating layer INS1 covering the gate electrodes GE. Even though not shown in the drawings, the semiconductor layer SM of each of the transistors TR may include an active layer and an ohmic contact layer.

The source electrode SE and the drain electrode DE of each of the transistors TR, which are spaced apart from each other, may be disposed on the semiconductor layer SM and the first insulating layer INS1. The semiconductor layer SM may form conductive channels between the source electrode SE and the drain electrode DE. The source electrodes SE of each of the transistors TR is connected to a corresponding one of the data lines DL1 to DLn.

A second insulating layer INS2 is disposed on the first insulating layer INS1 and covers the transistors TR. The second insulating layer INS2 may be defined as a passivation layer. The second insulating layer INS2 may be an inorganic insulating layer. The second insulating layer INS2 covers a portion of the semiconductor layer SM, which is exposed between the source electrode SE and the drain electrode DE.

A third insulating layer INS3 is disposed on the second insulating layer INS2. The third insulating layer INS3 may be an organic insulating layer including an organic material, and a top surface of the third insulating layer INS3 may have a flat shape. Contact holes are defined the second and third insulating layers INS2 and INS3 to expose predetermined areas of the drain electrode DE of each of the transistors TR.

The pixel electrodes PE are disposed on the third insulating layer INS3. The pixel electrodes PE are disposed to correspond to (or overlap in a thickness direction of the display panel 100 with) the pixel areas PXA, respectively. Each of the pixel electrodes PE are connected to the drain electrode DE of a corresponding one of the transistor TR through a contact hole CH.

The second substrate 120 includes a second base substrate SUB2, the color filters CF, a black matrix BM, and the common electrode CE. The color filters CF and the black matrix BM are disposed under the second base substrate SUB2 (or on a bottom surface of the second base substrate SUB2). The color filters CF are disposed to correspond to (or to overlap in the thickness direction with) the pixel areas PXA, and the black matrix BM is disposed to correspond to (or to overlap in the thickness direction with) the non-pixel area NPXA.

The color filter CF provides a color to light transmitted through the pixel area PXA. Each of the color filters CF may be one of a red color filter, a green color filter, and a blue color filter. The color filters CF of the pixels PX adjacent to each other may have different colors such that the adjacent pixels PX display colors different from each other.

The black matrix BM blocks light of the non-pixel area NPXA, which is not desired to be seen when an image is shown. The black matrix BM blocks light leakage which may occur by abnormal behavior of liquid crystal molecules at edges of the pixel areas PXA adjacent to the non-pixel area NPXA. In such an embodiment, the black matrix BM may effectively block or prevent a mixed color which may occur at edges of the color filters CF adjacent to the non-pixel area NPXA.

The common electrode CE is disposed under the color filters CF and the black matrix BM, and a fourth insulating layer INS4 is disposed under the common electrode CE. The fourth insulating layer INS4 may include an inorganic insulating layer or an organic insulating layer.

In an embodiment, the image display layer 130 disposed between the first and second substrates 110 and 120 may include the liquid crystal layers LC. In an embodiment, a cavity-defining layer CDL that defines a plurality of cavities MC may be disposed on the third insulating layer INS3. The cavities MC are defined through the cavity-defining layer CDL to expose predetermined areas of the pixel electrodes PE. A diameter of each of the cavities MC may be in a range from about 4 micrometers to about 5 micrometers at a top surface of the cavity-defining layer CDL. The cavity-defining layer CDL may be provided or formed by patterning an organic material. The organic material for forming the cavity-defining layer CDL may include a photoresist (or a photosensitive resin).

An inner side surface IS of the cavity-defining layer CDL, which defines each of the cavities MC, may form an inclination angle θs with a plane defined by the first and second directions DR1 and DR2. The inclination angle θs may be in a range from about 55 degrees to about 75 degrees. In such an embodiment, the inner side surface IS of the cavity-defining layer CDL may be an inclined surface which has the inclination angle θs in the range from about 55 degrees to about 75 degrees with respect to the plane defined by the first and second directions DR1 and DR2.

The cavities MC may overlap with the pixel areas PXA and may have cylindrical shapes. In an embodiment, as shown in FIG. 5, the diameter of each of the cavities MC may become progressively greater toward a top end thereof. In such an embodiment, as shown in FIG. 3, a cross section of each of the cavities MC may have an inverted trapezoidal shape. A fifth insulating layer INS5 is disposed on the cavity-defining layer CDL and the first substrate 110 of the pixel areas PXA. The fifth insulating layer INS5 may be disposed on the pixel electrodes PE in the cavities MC. The fifth insulating layer INS5 may be an inorganic insulating layer.

The liquid crystal layer LC may be disposed on the fifth insulating layer INS5 in each of the cavities MC. The liquid crystal layer LC may include a plurality of liquid crystal molecules LCM. The liquid crystal molecules LCM may be vertically oriented to the plane defined by the first and second directions DR1 and DR2 when the pixels PX are not driven or no electric field is generated between the pixel electrodes PE and the common electrode CE. The second substrate 120 is disposed on the fifth insulating layer INS5 to cover the liquid crystal layer LC.

Figure 6:
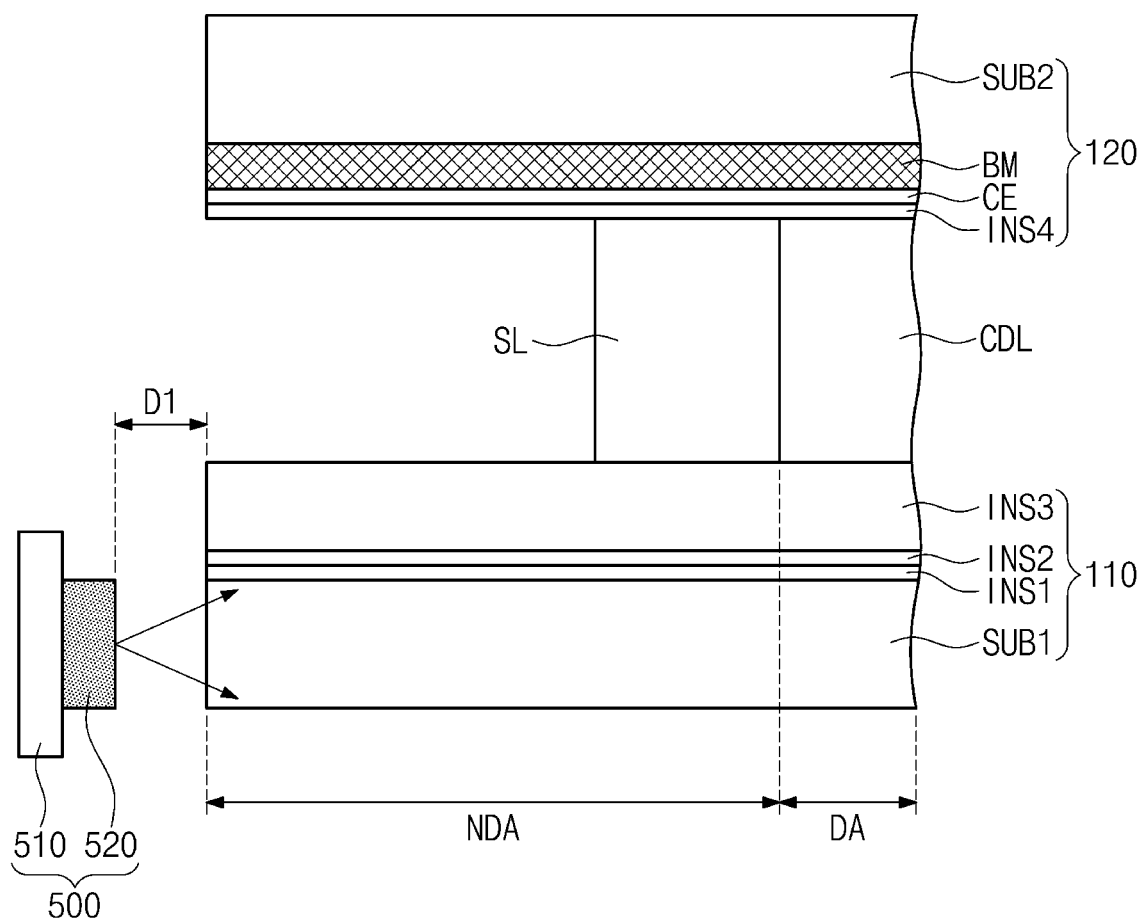
FIG. 6 is a cross-sectional view illustrating an area of a display panel adjacent to a light source.

FIG. 6 is a cross-sectional view illustrating a predetermined area of a display panel adjacent to a light source.

Referring to FIG. 6, a sealing layer SL is disposed between the first substrate 110 and the second substrate 120. The sealing layer SL is disposed in a non-display area NDA to surround the display area DA and bonds the first substrate 110 and the second substrate 120 to each other.

The light source units 520 of the light source 500 may be disposed to face a side surface of the first base substrate SUB1. A thickness of the light source unit 520 in a direction perpendicular to the plane defined by the first and second directions DR1 and DR2 (or a length of the light source unit 520 in the thickness direction of the display panel 100) may be equal to a thickness of the first base substrate SUB1.

When the light source unit 520 is spaced apart from the first base substrate SUB1 by a first distance D1, light emitted from the light source unit 520 toward the side surface of the first base substrate SUB1 may be provided to the side surface of the first base substrate SUB1 at an angle in a range from about zero (0) degree to about 48 degrees with respect to a normal line of the side surface of the first base substrate SUB1. The light provided to the first base substrate SUB1 may be guided in the first base substrate SUB1. The first distance D1 may be set to about 5 centimeters (cm).

Figure 7:
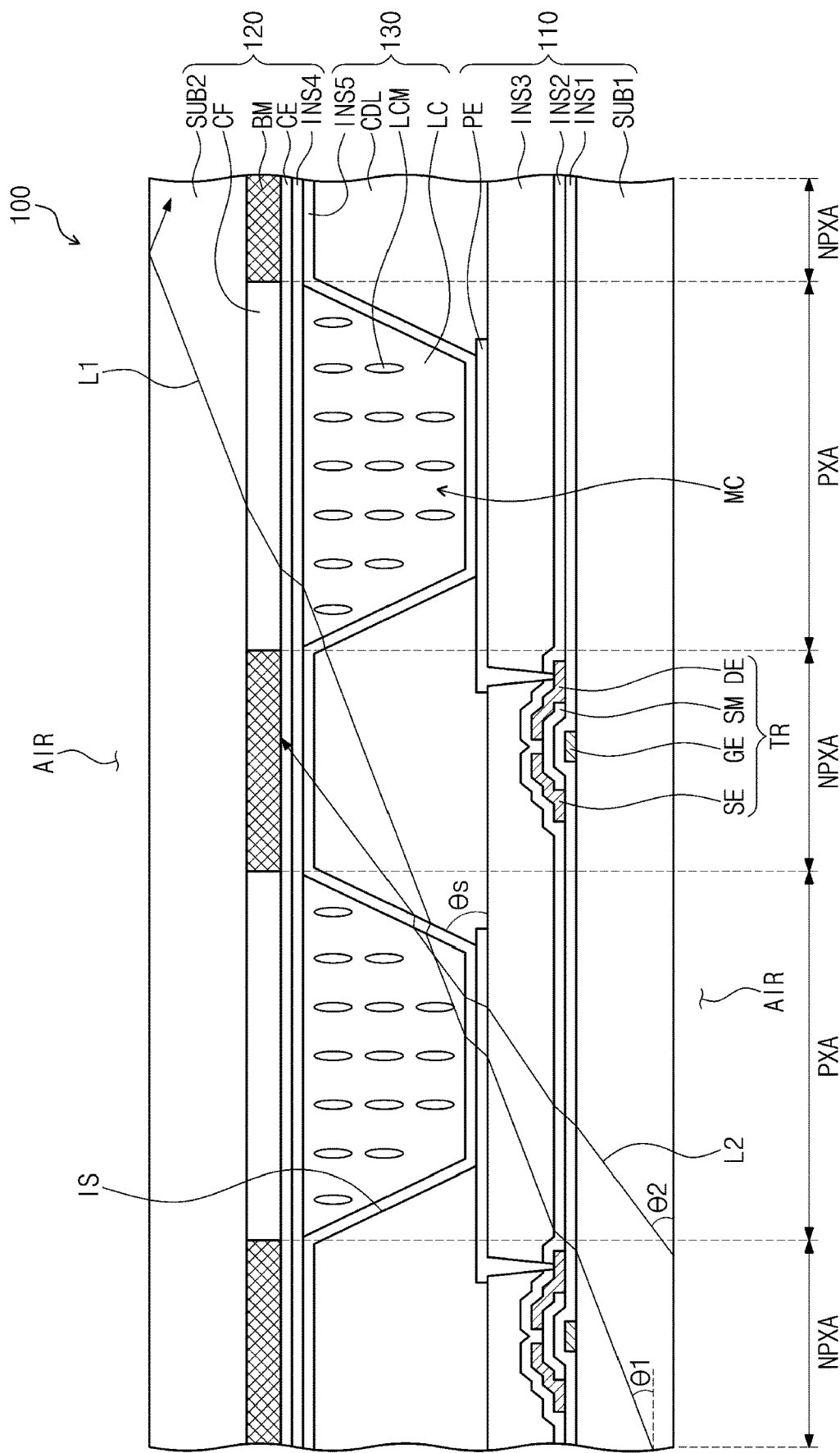
FIG. 7 is a cross-sectional view illustrating a traveling path of light in an off-state of pixels.
Figure 8:
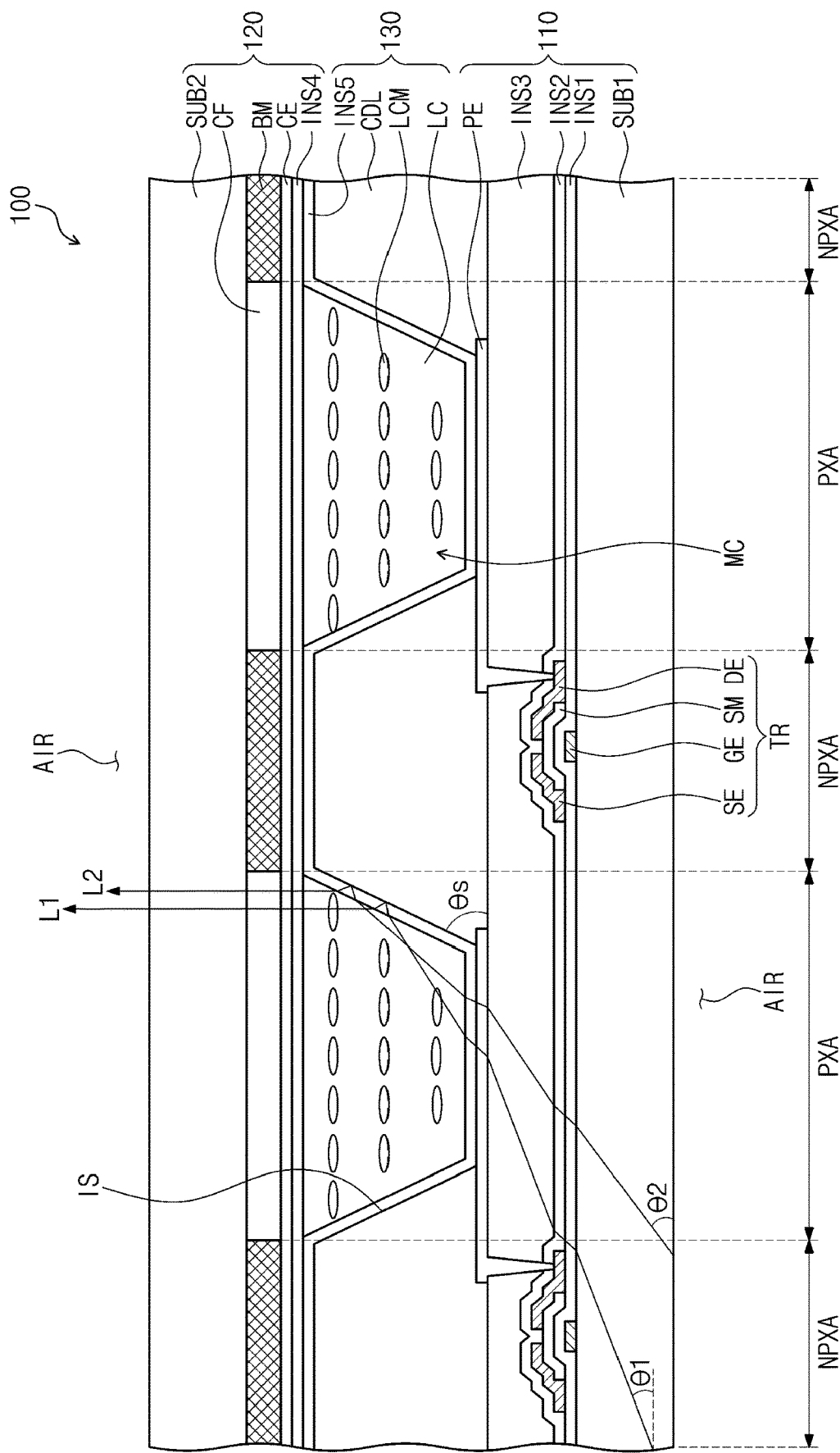
FIG. 8 is a cross-sectional view illustrating a traveling path of light in an on-state of pixels.

FIG. 7 is a cross-sectional view illustrating a traveling path of light in an off-state of pixels. FIG. 8 is a cross-sectional view illustrating a traveling path of light in an on-state of pixels.

Referring to FIG. 7, an operation in which the pixels PX are not driven may correspond to an off-state and may be defined as a black mode. In the black mode, the transistors TR are not driven and the liquid crystal layer LC is also not driven. In the black mode, the liquid crystal molecules LCM of the liquid crystal layer LC are maintained in a vertical orientation state.

In an embodiment, the first and second base substrates SUB1 and SUB2, which may include or be formed of a glass, the third insulating layer INS3 and the cavity-defining layer CDL, which may include or be formed of the organic insulating materials, and the non-driven liquid crystal layer LC may have a same refractive index as each other. In one embodiment, for example, the refractive index of each of the first base substrate SUB1, the second base substrate SUB2, the third insulating layer INS3, the cavity-defining layer CDL and the non-driven liquid crystal layer LC may be about 1.5.

Refractive indexes of the pixel electrode PE, the common electrode CE, and the first, second, fourth and fifth insulating layers INS1, INS2, INS4 and INS5 of the inorganic insulating layers are greater than the refractive indexes of the first and second base substrates SUB1 and SUB2, the third insulating layer INS3, the cavity-defining layer CDL and the liquid crystal layer LC. A refractive index of the color filter CF, which may include or be formed of the organic material, may be greater than the refractive index of the first base substrate SUB1 and smaller than a refractive index of an inorganic insulating layer.

A bottom surface of the first base substrate SUB1 is parallel to the plane defined by the first and second directions DR1 and DR2. First light L1 travels at a first angle θ1 with respect to the bottom surface of the first base substrate SUB1, and second light L2 travels at a second angle θ2 with respect to the bottom surface of the first base substrate SUB1. Here, the second angle θ2 is greater than the first angle θ1. Each of the first and second angles θ1 and θ2 may be equal to or greater than about 17 degrees and may be equal to or smaller than about 48 degrees.

The first light L1 traveling at the first angle θ1 in the first base substrate SUB1 may be refracted at an angle greater than the first angle θ1 at a medium having a greater refractive index than the first base substrate SUB1 (e.g., the pixel electrode PE, the common electrode CE, and the first, second, fourth and fifth insulating layers INS1, INS2, INS4 and INS5 of the inorganic insulating layers) but may travel again at the first angle θ1 in a medium having the same refractive index as the first base substrate SUB1 (e.g., the second base substrate SUB2, the third insulating layer INS3, the cavity-defining layer CDL and the non-driven liquid crystal layer LC).

The second light L2 traveling at the second angle θ2 in the first base substrate SUB1 may also be refracted at an angle greater than the second angle θ2 at the medium having a greater refractive index than the first base substrate SUB1 but may travel again at the second angle θ2 in the medium having the same refractive index as the first base substrate SUB1.

In the black mode, the first light L1 and the second light L2 traveling at the first angle θ1 and the second angle θ2 in the first base substrate SUB1 may travel again at the first angle θ1 and the second angle θ2 in the non-driven liquid crystal layer LC, respectively. In such an embodiment, an incident angle of each of the first and second lights L1 and L2 transmitted through the fifth insulating layer INS5 may be smaller than a critical angle. Thus, the first and second lights L1 and L2 transmitted through the fifth insulating layer INS5 may travel into the cavity-defining layer CDL.

The first light L1 traveling at the first angle θ1 may travel to the black matrix BM and may be absorbed in the black matrix BM. The second light L2 traveling at the second angle θ2 may travel to the second base substrate SUB2.

When light traveling at an angle equal to or smaller than about 48 degrees is provided into each of the first and second base substrates SUB1 and SUB2, the light is not transmitted to the outside of each of the first and second base substrates SUB1 and SUB2 but is totally reflected at an interface between an air layer AIR and each of the first and second base substrates SUB1 and SUB2 or blocked by the black matrix BM. Thus, the second light L2 traveling at the second angle θ2 is totally reflected at a top surface of the second base substrate and is not outputted to the outside of the display panel 100. As a result, an image is not displayed in the black mode.

Referring to FIG. 8, an operation in which the pixels PX are driven may correspond to an on-state and may be defined as a white mode. The data voltages are applied to the pixel electrodes PE through the transistors TR and the common voltage is applied to the common electrode CE, and thus the liquid crystal layer LC is driven. When the liquid crystal layer LC is driven, the liquid crystal molecules LCM of the liquid crystal layer LC may be driven from vertical orientation to horizontal orientation.

A refractive index of the liquid crystal layer LC when the liquid crystal layer LC is driven may be greater than the refractive index of the liquid crystal layer LC when the liquid crystal layer LC is not driven. In one embodiment, for example, when the liquid crystal layer LC is driven, the refractive index of the liquid crystal layer LC may be greater than about 1.5 and equal to or smaller than about 1.75. When the liquid crystal layer LC is driven, the refractive index of the liquid crystal layer LC is greater than the refractive indexes of the base substrates SUB1 and SUB2, the third insulating layer INS3, and the cavity-defining layer CDL and is smaller than the refractive indexes of the pixel electrode PE, the common electrode CE, and the first, second, fourth, and fifth insulating layers INS1, INS2, INS4 and INS5.

The first light L1 traveling at the first angle θ1 in the first base substrate SUB1 may be refracted at an angle greater than the first angle θ1 at the liquid crystal layer LC of which the refractive index is increased. In the white state, an incident angle of the first light L1 transmitted through the fifth insulating layer INS5 may be greater than the critical angle, and thus the first light L1 may be totally reflected at an interface between the fifth insulating layer INS5 and the cavity-defining layer CDL. The first light L1 reflected at the interface between the fifth insulating layer INS5 and the cavity-defining layer CDL may travel upward and may pass through the second base substrate SUB2, and thus the first light L1 may be outputted to the outside of the display panel 100.

The second light L2 traveling at the second angle θ2 in the first base substrate SUB1 may be refracted at an angle greater than the second angle θ2 at the liquid crystal layer LC of which the refractive index is increased. In the white state, an incident angle of the second light L2 transmitted through the fifth insulating layer INS5 may be greater than the critical angle, and thus the second light L2 may be totally reflected at the interface between the fifth insulating layer INS5 and the cavity-defining layer CDL. The second light L2 reflected at the interface between the fifth insulating layer INS5 and the cavity-defining layer CDL may travel upward and may pass through the second base substrate SUB2, and thus the second light L2 may be outputted to the outside of the display panel 100. Thus, an image may be displayed in the white mode.

The common voltage applied to the common electrode CE may have a constant voltage level, and the data voltage applied to the pixel electrode PE may have various voltage levels on the basis of a displayed gray scale. Since the refractive index of the liquid crystal layer LC is varied according to a difference between the data voltage applied to the pixel electrode PE and the common voltage applied to the common electrode CE, the refractive index of the liquid crystal layer LC may be set to various values when the data voltage is varied.

When the pixels PX are driven, the refractive index of the liquid crystal layer LC may be greater than about 1.5 and may be further increased as the difference between the data voltage of the pixel electrode PE and the common voltage of the common electrode CE increases. In some embodiments, the refractive index of the liquid crystal layer LC may have the maximum value of about 1.75.

An angle at which the light traveling to the liquid crystal layer LC is refracted may increase as the refractive index of the liquid crystal layer LC increases. The amount of the light totally reflected at the interface between the fifth insulating layer INS5 and the cavity-defining layer CDL may be varied according to a refraction angle of the light traveling in the liquid crystal layer LC. Accordingly, in such an embodiment, the gray scale may be displayed according to the voltage level of the data voltage applied to the pixel electrode PE.

FIGS. 9A, 9B, 10A, and 10B are cross-sectional views illustrating ranges of refracted light in a display apparatus according to embodiments of the invention.

Figure 9A:
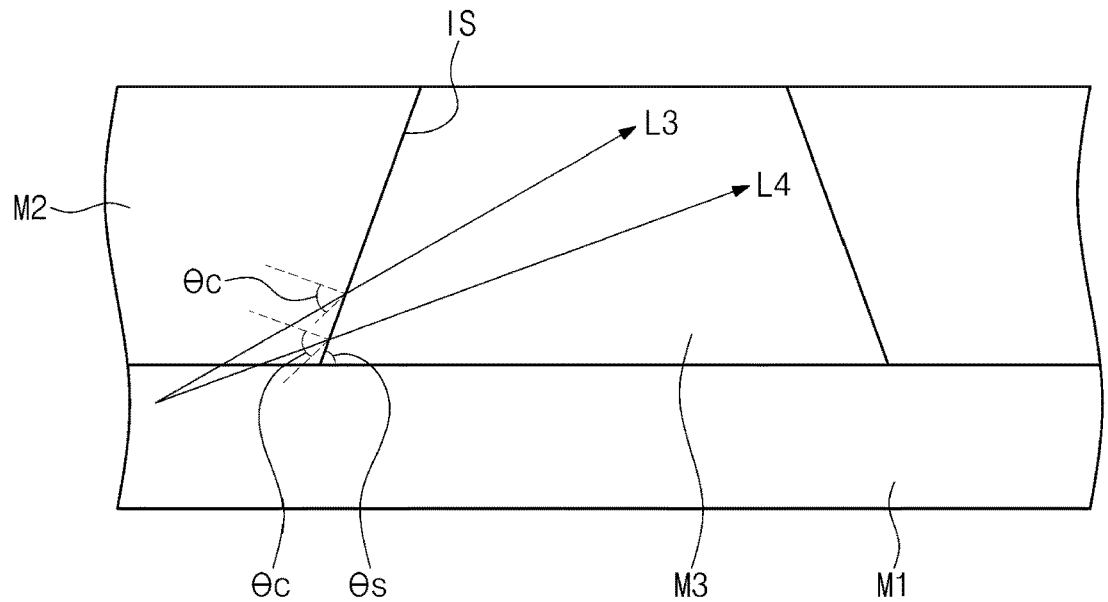
FIGS. 9A, 9B, 10A, and 10B are cross-sectional views illustrating ranges of refracted light in a display apparatus according to embodiments of the invention.
Figure 9B:
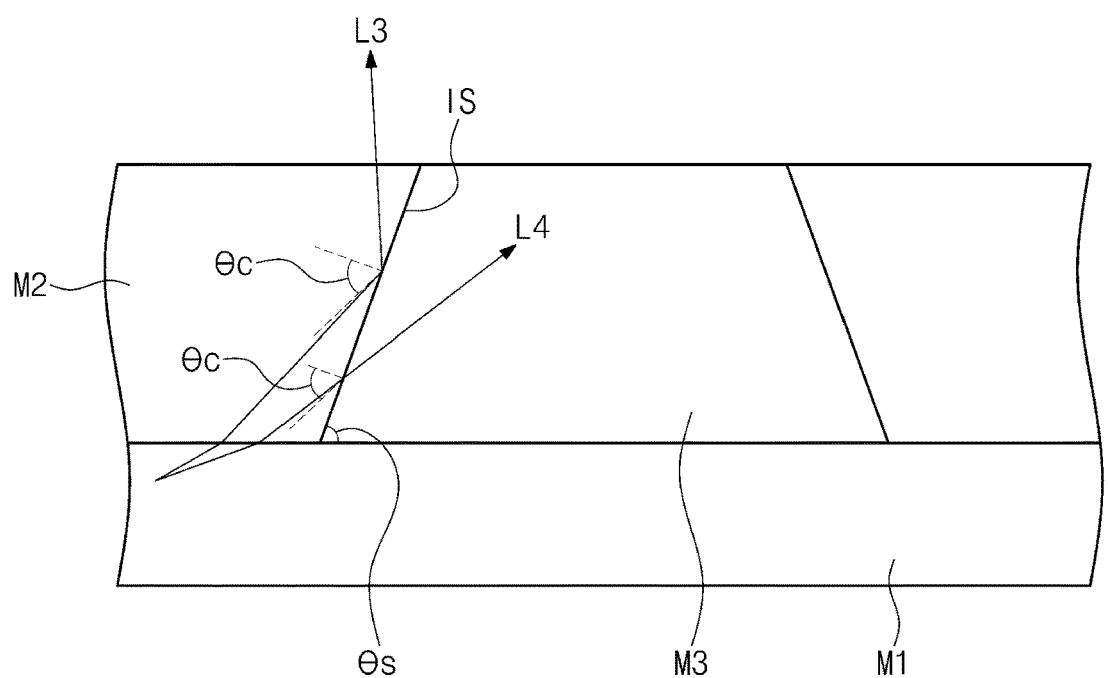
Figure 10A:
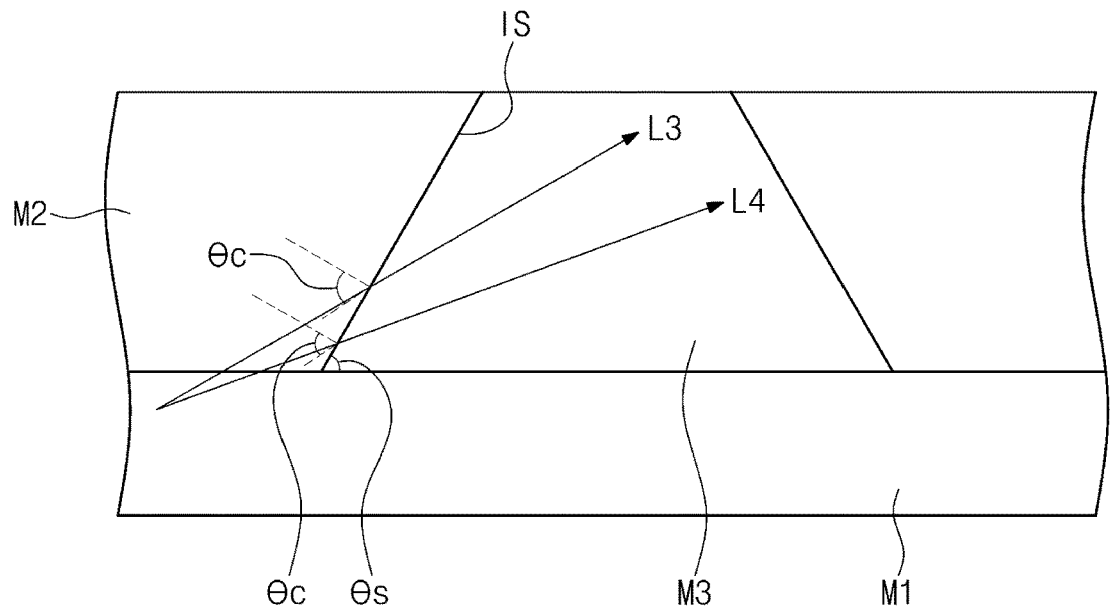
Figure 10B:
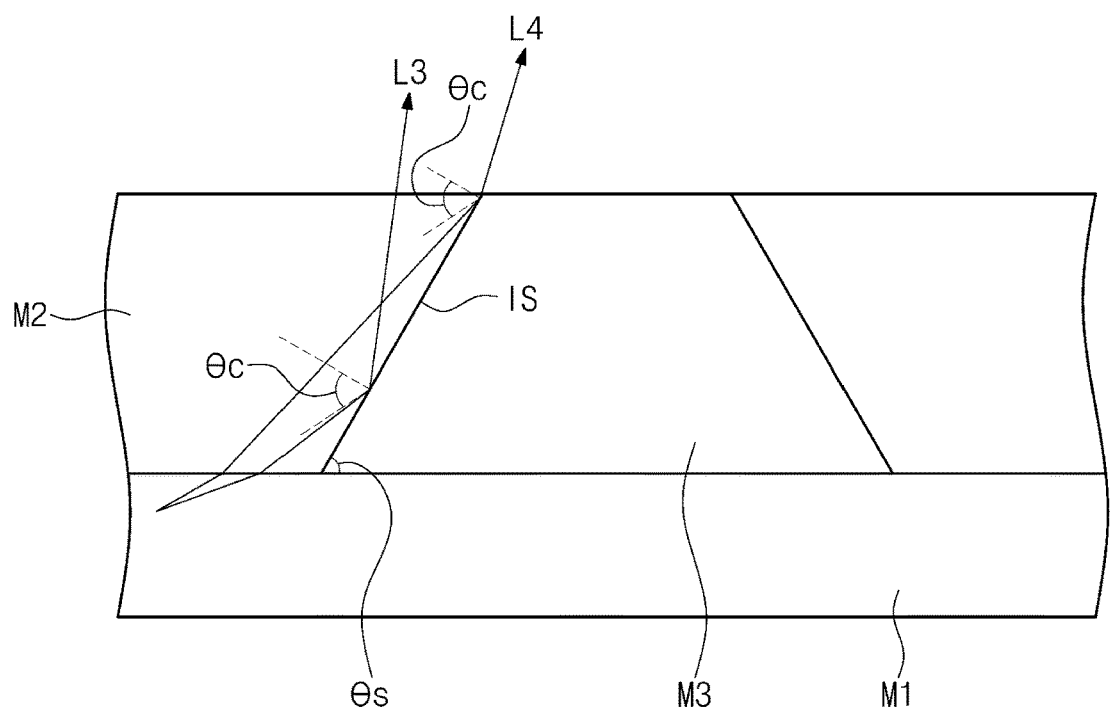

For the purpose of ease and convenience in description and illustration, FIGS. 9A, 9B, 10A and 10B illustrate a first medium M1 corresponding to the first base substrate SUB1, a second medium M2 corresponding to the liquid crystal layer LC, and a third medium M3 corresponding to the cavity-defining layer CDL. A refractive index of the second medium M2 illustrated in FIGS. 9A and 10A is equal to the refractive index of the liquid crystal layer LC when the liquid crystal layer LC is not driven. A refractive index of the second medium M2 illustrated in FIGS. 9B and 10B is equal to the refractive index of the liquid crystal layer LC when the liquid crystal layer LC is driven.

Referring to FIG. 9A, in an embodiment, the first, second and third mediums M1, M2 and M3 have the same refractive index as each other. An inner side surface IS of the third medium M3 corresponding to the cavity-defining layer CDL may form an inclination angle θs with the plane defined by the first and second directions DR1 and DR2. The inclination angle θs may be about 70 degrees.

Third light L3 and fourth light L4 travel at predetermined angles with respect to a bottom surface of the first medium M1 in the first medium M1, respectively. The angle between the third light L3 and the bottom surface of the first medium M1 may be greater than the angle between the fourth light L4 and the bottom surface of the first medium M1. The third light L3 and the fourth light L4 may be any two of lights traveling in the first medium M1 at angles in a range from about 17 degrees to about 48 degrees with respect to the bottom surface of the first medium M1. The bottom surface of the first medium M1 may be parallel to the plane defined by the first and second directions DR1 and DR2.

The third light L3 and the fourth light L4 traveling at the predetermined angles with respect to the bottom surface of the first medium M1 pass through the second medium M2 with no total refraction, that is, while maintaining the angles thereof. Incident angles of the third light L3 and the fourth light L4 are smaller than a critical angle θc at an interface between the second and third mediums M2 and M3. Thus, the third light L3 and the fourth light L4 are not totally reflected at the interface between the second and third mediums M2 and M3 but travel into the third medium M3.

Referring to FIG. 9B, the refractive index of the second medium M2 is greater than the refractive index of the first medium M1 and the refractive index of the third medium M3. The third and fourth lights L3 and L4 traveling at the predetermined angles from the bottom surface of the first medium M1 are totally refracted at an interface between the first and second mediums M1 and M2 at angles greater than the predetermined angles and pass through the second medium M2.

An incident angle of the third light L3 may be greater than the critical angle θc at the interface between the second and third mediums M2 and M3. However, an incident angle of the fourth light L4 may be smaller than the critical angle θc at the interface between the second and third mediums M2 and M3. Thus, the third light L3 is totally reflected at the interface between the second and third mediums M2 and M3. However, the fourth light L4 is not totally reflected at the interface between the second and third mediums M2 and M3 but is transmitted into the third medium M3. Accordingly, when the inclination angle of the inner side surface IS of the third medium M3 is about 70 degrees, the third light L3 traveling at an angle in a range from about 17 degrees to about 48 degrees may be totally reflected at the interface between the second and third mediums M2 and M3, but the fourth light L4 traveling at another angle that is not in the range from about 17 degrees to about 48 degrees may not be totally reflected at the interface between the second and third mediums M2 and M3.

Referring to FIG. 10A, in an alternative embodiment, the first, second and third mediums M1, M2 and M3 may have the same refractive index as each other, and the inclination angle θs of the inner side surface IS of the third medium M3 may be about 60 degrees.

The third light L3 and the fourth light L4 traveling at the predetermined angles from the bottom surface of the first medium M1 pass through the second medium M2 without total reflection or while maintaining the angles thereof. Since the incident angles of the third light L3 and the fourth light L4 are smaller than the critical angle θc at the interface between the second and third mediums M2 and M3, the third light L3 and the fourth light L4 are not totally reflected at the interface between the second and third mediums M2 and M3 but travels into the third medium M3.

Referring to FIG. 10B, the refractive index of the second medium M2 is greater than the refractive index of the first medium M1 and the refractive index of the third medium M3, and the third light L3 and the fourth light L4 are refracted at the interface between the first and second mediums M1 and M2 at greater angles to travel into the second medium M2.

The incident angle of the third light L3 may be greater than the critical angle θc at the interface between the second and third mediums M2 and M3. The incident angle of the fourth light L4 may also be greater than the critical angle θc at the interface between the second and third mediums M2 and M3. Thus, the third light L3 and the fourth light L4 are totally reflected at the interface between the second and third mediums M2 and M3. In such an embodiment, when the inclination angle of the inner side surface IS of the third medium M3 is about 60 degrees, the third light L3 and the fourth light L4 among lights traveling at angles in the range from about 17 degrees to about 48 degrees are totally reflected at the interface between the second and third mediums M2 and M3.

In such an embodiment described above, the amount of light totally reflected at the inner side surface IS of the third medium M3 may decrease as the inclination angle of the inner side surface IS of the third medium M3 increases. In such an embodiment, the amount of light totally reflected at the inner side surface IS of the third medium M3 may increase as the inclination angle of the inner side surface IS of the third medium M3 decreases.

FIGS. 9B and 10B illustrate only the third medium M3 which corresponds to the cavity-defining layer CDL having a smaller refractive index than the liquid crystal layer LC when the liquid crystal layer LC is driven. However, even though the fifth insulating layer INS5 is disposed on the third medium M3, the amount of the light totally reflected at the inner side surface IS of the third medium M3 may be varied according to the inclination angle of the inner side surface IS of the third medium M3, similarly to the operation described with reference to FIGS. 9B and 10B.

In some embodiments of the invention, the inclination angle of the inner side surface IS of the cavity-defining layer CDL may be set to be in a range from about 55 degrees to about 75 degrees. When the inclination angle of the inner side surface IS of the cavity-defining layer CDL is set in the range from about 55 degrees to about 75 degrees and the cavity-defining layer CDL is driven, light traveling in the first base substrate SUB1 at an angle in a range from a first angle to a second angle with respect to the bottom surface of the first base substrate SUB1 may be totally reflected at the inner side surface IS of the cavity-defining layer CDL. Here, the second angle is greater than the first angle. The first angle may be defined as the minimum angle at which light is totally reflected at the inner side surface IS of the cavity-defining layer CDL. The second angle may be defined as the maximum angle at which light is totally reflected at the inner side surface IS of the cavity-defining layer CDL.

When the inclination angle of the inner side surface IS of the cavity-defining layer CDL is about 55 degrees, the first angle may be set to be about 17 degrees and the second angle may be set to be about 48 degrees. The first angle may increase more than about 17 degrees as the inclination angle of the inner side surface IS of the cavity-defining layer CDL increases. When the inclination angle of the inner side surface IS of the cavity-defining layer CDL is in a range from about 55 degrees to about 75 degrees, the second angle may be about 48 degrees. When the inclination angle of the inner side surface IS of the cavity-defining layer CDL is set to be in the range from about 55 degrees to about 75 degrees, a user may normally view an image.

As a result, the light totally reflected at the inner side surface IS of the cavity-defining layer CDL may be light which travels at an angle in a range from about 17 degrees to about 48 degrees with respect to the bottom surface of the first base substrate SUB1 in the first base substrate SUB1.

In some embodiments of the invention, the light source 500 provides light directly to the first substrate 110. In such embodiments, the cavity-defining layer CDL is disposed on the first substrate 110, and the liquid crystal layer LC is disposed in the cavities MC. Thus, the black mode and the white mode may be realized. In such embodiments, the light is provided to the display panel without an optical sheet, a light guide plate, and a polarizing plate, thereby displaying an image. Thus, a total thickness of the display apparatus 600 may be substantially reduced, and a light loss caused by the optical sheet and the polarizing plate may not occur, thereby improving light-emitting efficiency.

FIGS. 11 to 14 are cross-sectional views illustrating a method of fabricating a display apparatus, according to some embodiments of the invention.

Figure 11:
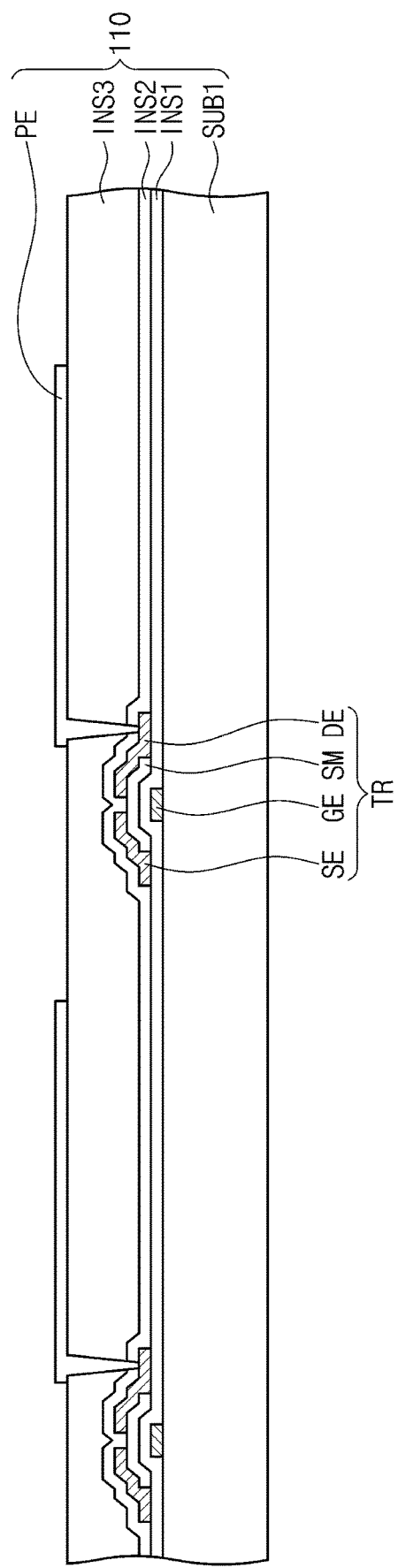
FIGS. 11 to 14 are cross-sectional views illustrating a method of fabricating a display apparatus, according to an embodiment of the invention.

Referring to FIG. 11, in an embodiment of a method of fabricating a display apparatus, the first base substrate SUB1 is prepared, and the transistors TR are provided on the first base substrate SUB1 of the non-pixel area NPXA. The third insulating layer INS3 is provided to cover the transistors TR. The pixel electrodes PE are provided on the third insulating layer INS3 to correspond to the pixel areas PXA. The pixel electrodes PE are connected to the transistors TR. As a result, the first substrate 110 may be prepared.

Figure 12:
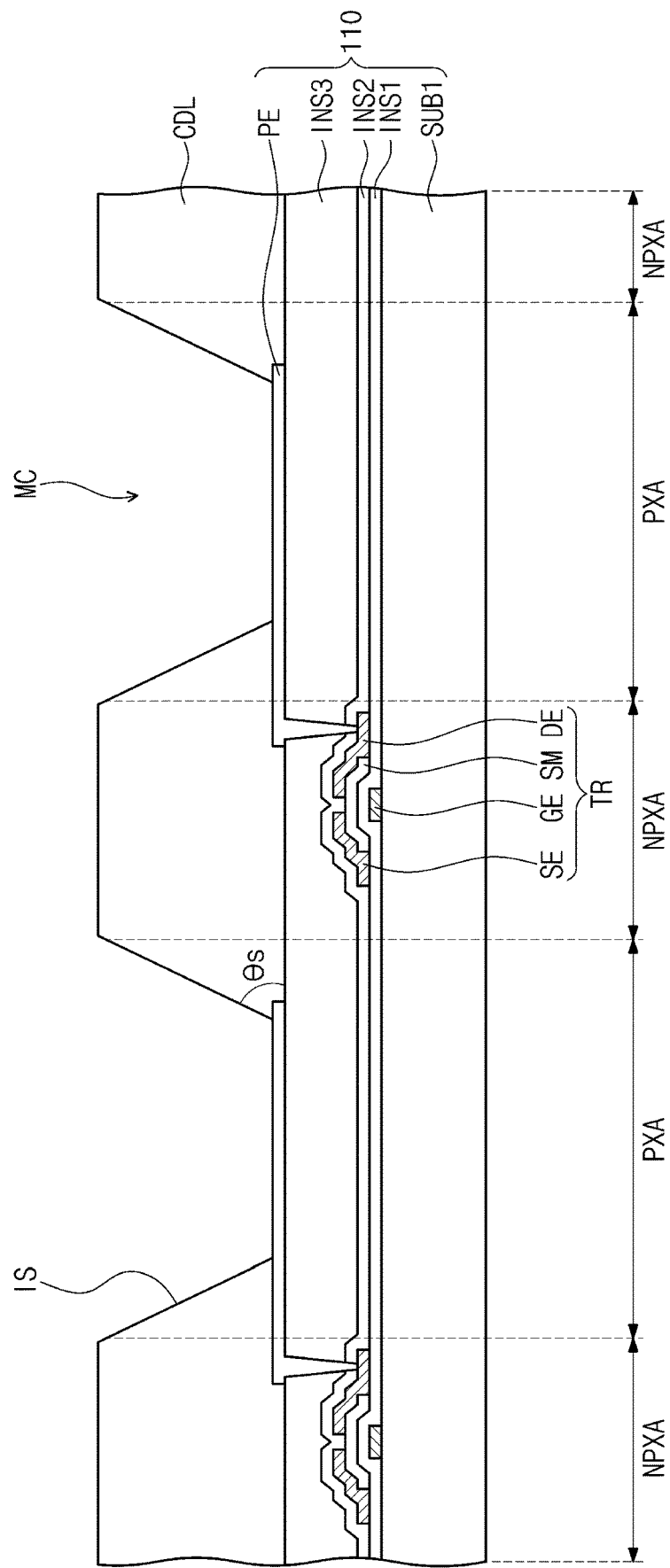

Referring to FIG. 12, the cavity-defining layer CDL defining the cavities MC is provided on the first substrate 110. In such an embodiment, a photoresist may be provided on the first substrate 110, and portions of the photoresist corresponding to the pixel areas PXA may be removed by an exposure process and a development process to form the cavity-defining layer CDL defining the cavities MC.

The cavities MC may have cylindrical shapes, and a diameter of each of the cavities MC may become progressively greater from a bottom end toward a top end of each of the cavities MC. As a result, the cross section of each of the cavities MC may have an inverted trapezoidal shape. In such an embodiment, as described above, the inner side surface of the cavity-defining layer CDL, which defines each of the cavities MC, may have the inclination angle in a range from about 55 degrees to about 75 degrees with respect to the bottom surface of the first base substrate SUB1.

Figure 13:
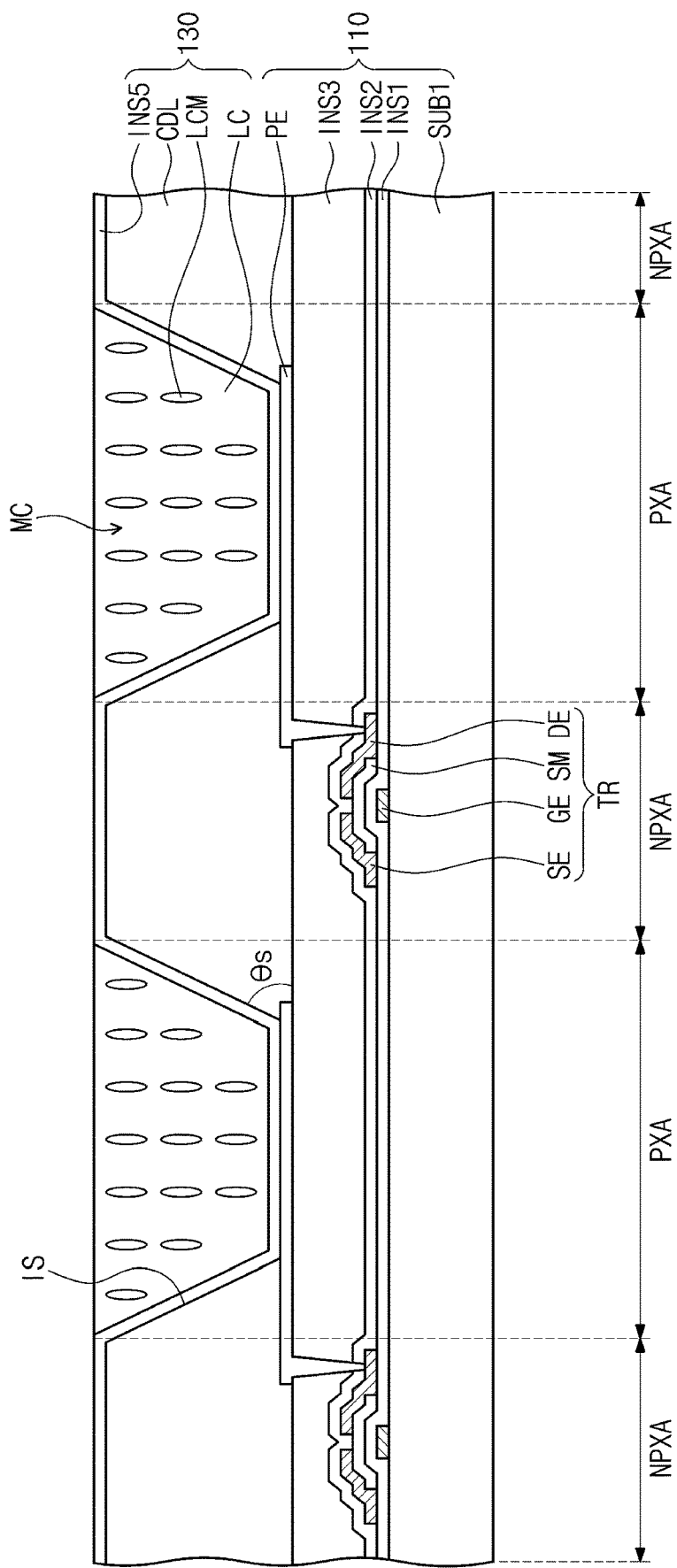

Referring to FIG. 13, the fifth insulating layer INS5 is provided on the cavity-defining layer CDL and the pixel electrodes PE of the first substrate 110 exposed through the cavities MC. The liquid crystal layer LC is provided on the fifth insulating layer INS5 in the cavities MC. The liquid crystal layer LC is provided in the pixel areas PXA.

Figure 14:
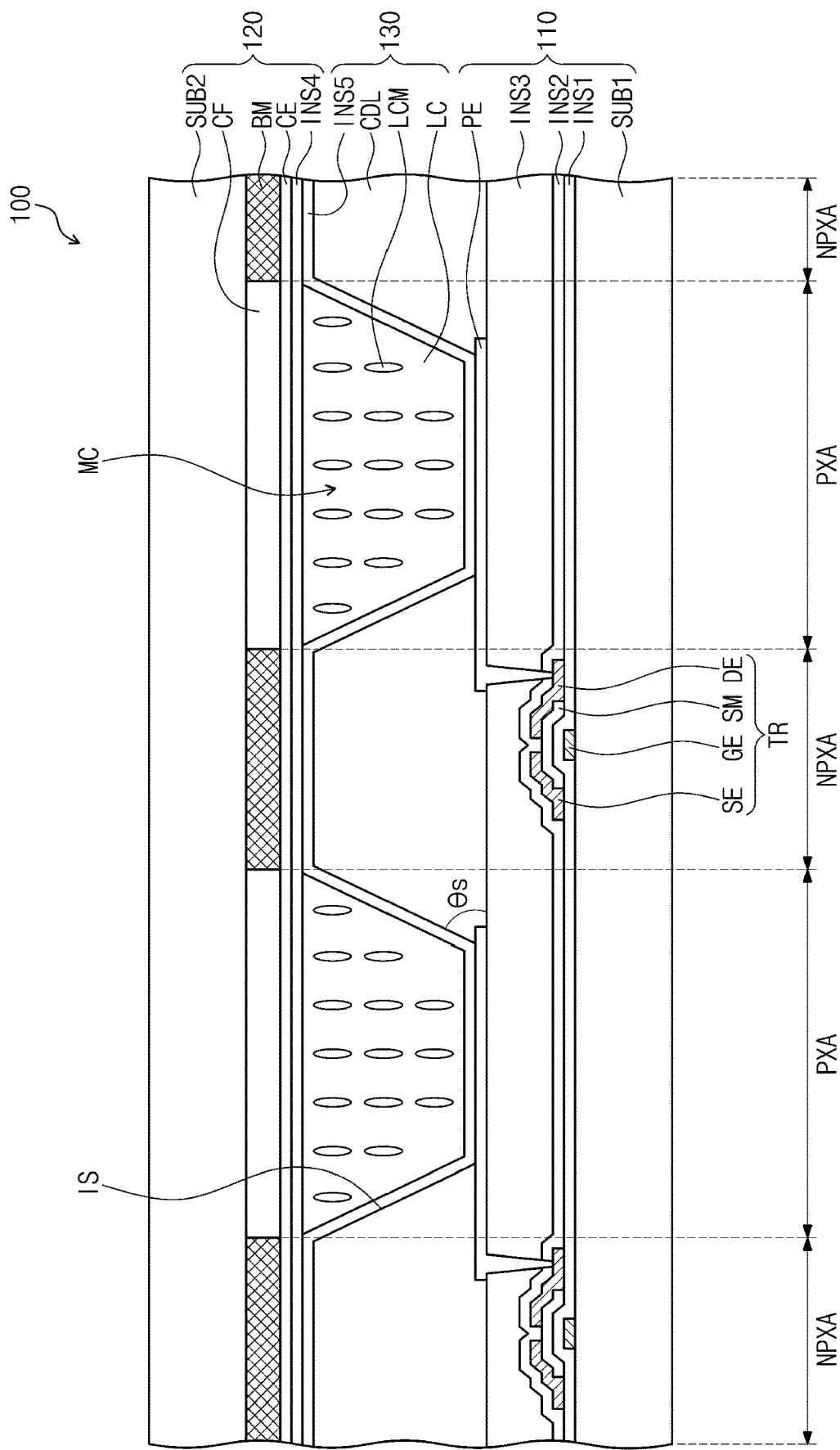

Referring to FIG. 14, the second substrate 120 is provided on the fifth insulating layer INS5 to cover the liquid crystal layer LC, such that the display apparatus 600 may be fabricated.

Figure 15:
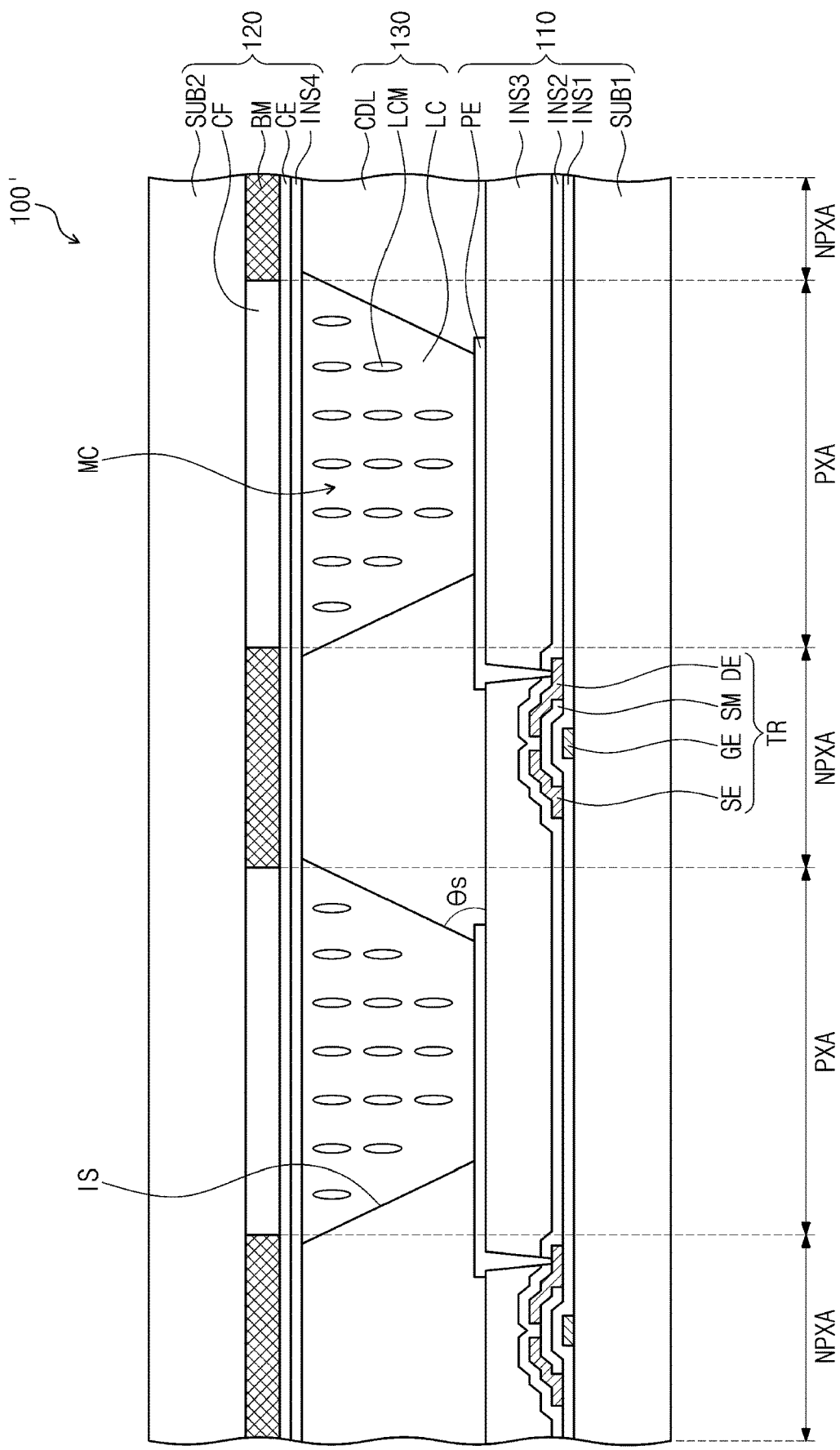
FIG. 15 is a cross-sectional view illustrating a display apparatus according to an alternative embodiment of the invention.

FIG. 15 is a cross-sectional view illustrating a display apparatus according to an alternative embodiment of the invention.

For the purpose of ease and convenience in description and illustration, the cross-sectional view in FIG. 15 is substantially the same as the cross-sectional view shown in FIG. 3 except for the fifth insulating layer INS5. The same or like elements shown in FIG. 15 have been labeled with the same reference characters as used above to describe the embodiments of the display apparatus stage shown in FIG. 3, and any repetitive detailed description thereof will hereinafter be omitted or simplified.

In an embodiment, as shown in FIG. 3, the fifth insulating layer INS5 is disposed on the cavity-defining layer CDL and the pixel electrodes PE of the first substrate 110. In an alternative embodiment, referring to FIG. 15, the fifth insulating layer INS5 is omitted. In such an embodiment, the cavity-defining layer CDL defining cavities MC may be disposed on a first substrate 110 of a display panel 100', the liquid crystal layer LC may be disposed in the cavities MC, and a second substrate 120 may be disposed on the cavity-defining layer CDL to cover the liquid crystal layer LC. In such an embodiment, where the fifth insulating layer INS5 is omitted, light may be totally reflected at the inner side surface IS of the cavity-defining layer CDL to display an image, as described with reference to FIGS. 9A, 9B, 10A, and 10B.

Figure 16:
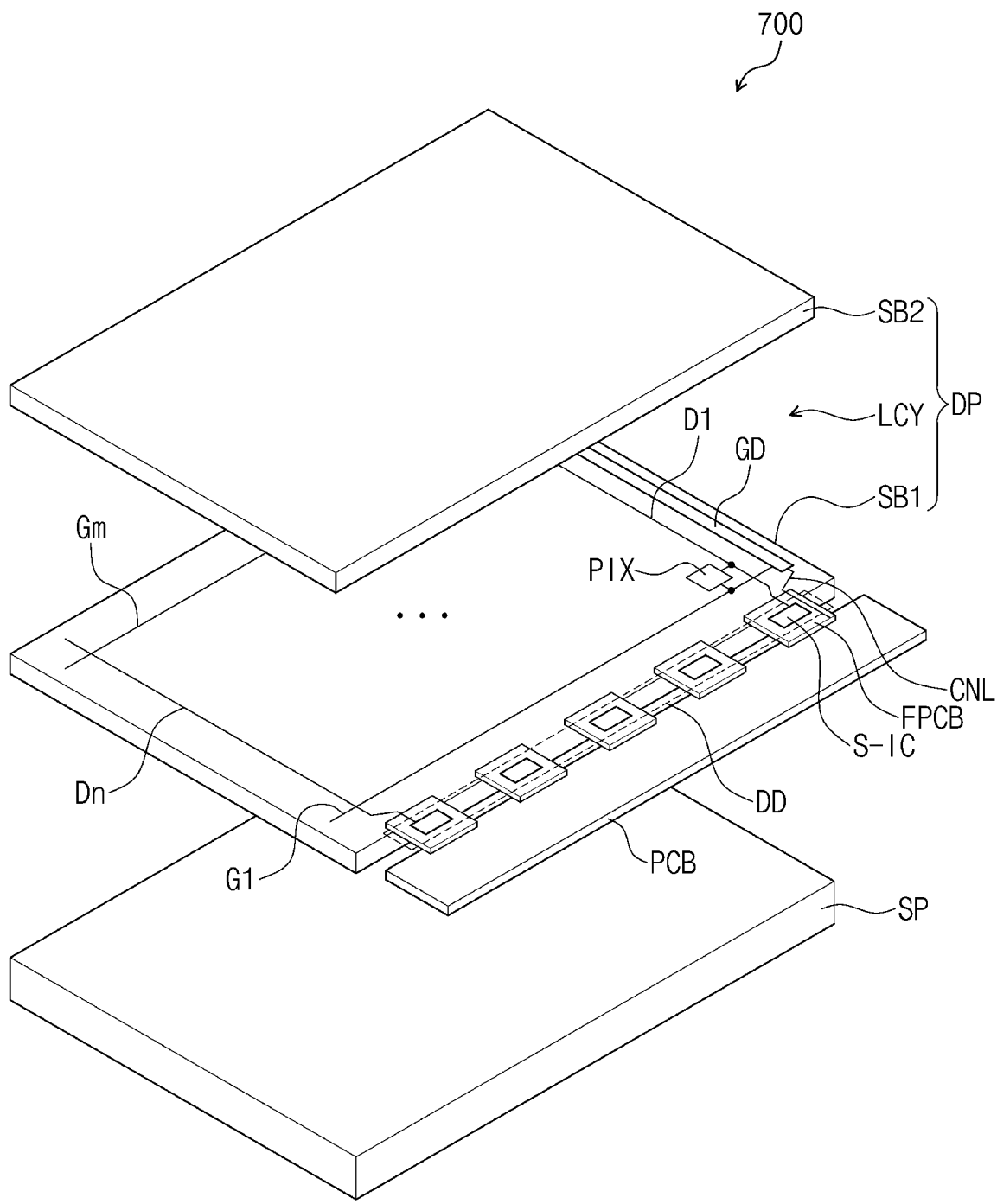
FIG. 16 is an exploded perspective view illustrating a display apparatus according to another alternative embodiment of the invention.
Figure 17:
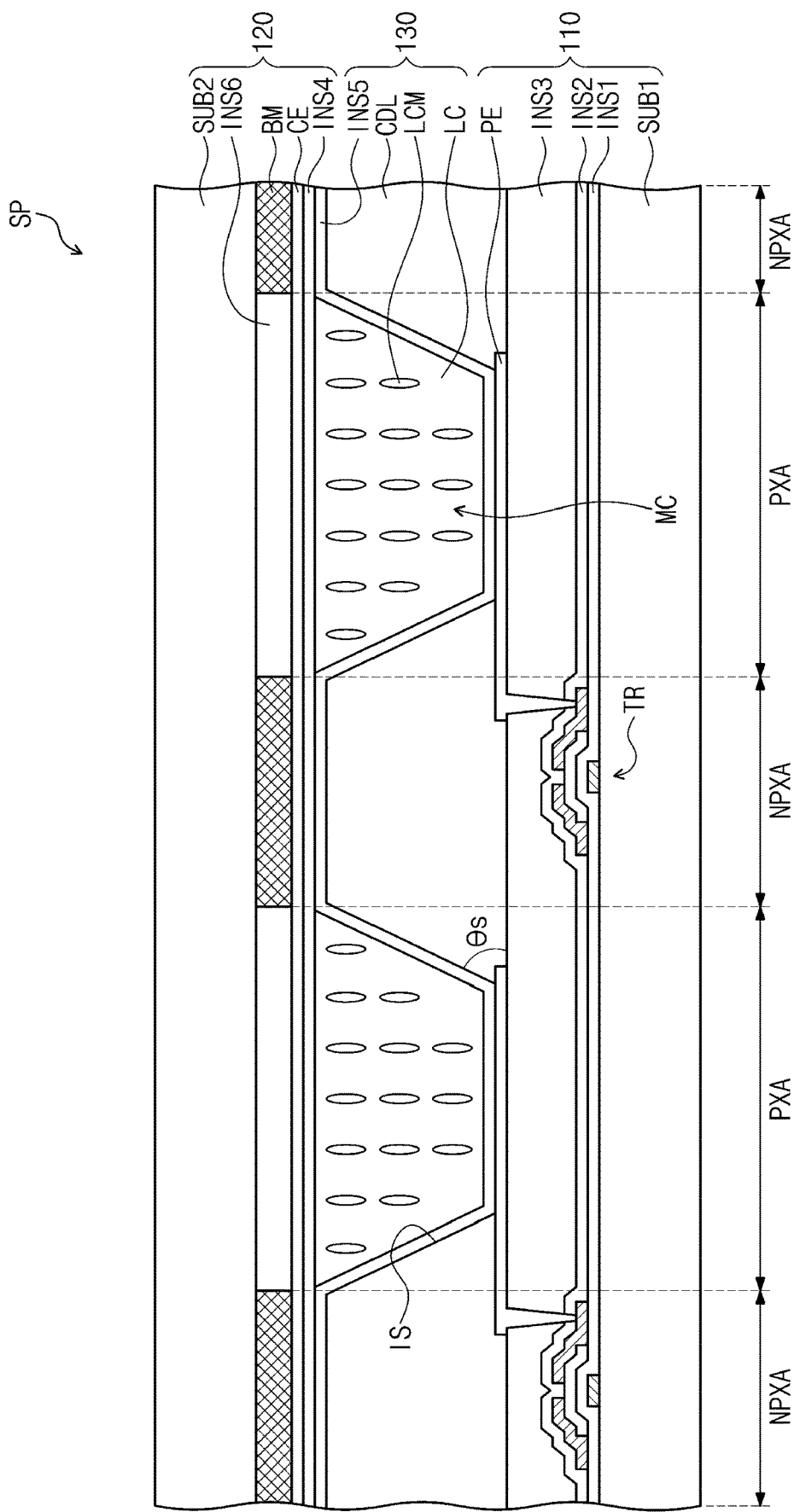
FIG. 17 is a cross-sectional view illustrating a shutter panel of FIG. 16.

FIG. 16 is an exploded perspective view illustrating a display apparatus according to another alternative embodiment of the invention. FIG. 17 is a cross-sectional view illustrating a shutter panel of FIG. 16.

For the purpose of ease and convenience in description and illumination, FIG. 17 shows a cross-sectional view substantially corresponding to the cross-sectional view in FIG. 3.

Referring to FIGS. 16 and 17, an exemplary embodiment of a display apparatus 700 includes a shutter panel SP and a display panel DP disposed on the shutter panel SP. The shutter panel SP has substantially the same elements and the same functions as the display panel 100 of FIG. 3 except for the color filters CF. In an exemplary embodiment, as shown in FIG. 3, the display apparatus 600 includes the color filters CF disposed under the second base substrate SUB2 of the display panel 100. In an alternative exemplary embodiment, as shown in FIG. 17, the shutter panel SP includes a plurality of sixth insulating layers INS6 disposed under the second base substrate SUB2 instead of the color filters CF. The sixth insulating layers INS6 may be organic insulating layers and may be disposed to correspond to (or to overlap in the thickness direction with) the pixel areas PXA. Other elements of the shutter panel SP are substantially the same as corresponding elements of the display apparatus 600 illustrated in FIGS. 1 and 3.

The shutter panel SP generates light and provides the generated light to the display panel DP. In one exemplary embodiment, for example, since the shutter panel SP has the same elements as the display apparatus 600 of FIG. 1 except for the color filters CF, the shutter panel SP includes the light source 500 and outputs the light generated from the light source 500 in an upward direction. The shutter panel SP further includes the gate driver 200, the data driver 400, and the printed circuit board 300, which are illustrated in FIG. 1. The shutter panel SP may operate in the black mode and the white mode, like the operations of the pixels PX of the display apparatus 600 described above with reference to FIGS. 7 and 8.

When the shutter panel SP operates in the black mode, the shutter panel SP does not emit or output the light. When the shutter panel SP operates in the white mode, the shutter panel SP emits or output the light. Since the shutter panel SP does not include the color filters CF, the shutter panel SP does not display an image. However, the shutter panel SP generates the light and provides the generated light to the display panel DP, similarly to a general backlight unit.

The display panel DP includes a first substrate SB1, a second substrate SB2 facing the first substrate SB1, and a liquid crystal layer LCY disposed between the first substrate SB1 and the second substrate SB2. The first substrate SB1 includes a plurality of gate lines G1 to Gm extending in a first direction DR1, a plurality of data lines D1 to Dn extending in a second direction DR2, and a plurality of pixels PIX connected to the gate lines G1 to Gm and the data lines D1 to Dn. In FIG. 16, one pixel PIX is illustrated for the purpose of ease and convenience in description and illustration, but not being limited thereto. In such an embodiment, a plurality of pixels PIX may be disposed on the first substrate SB1.

Even though not shown in FIG. 16, pixel electrodes of the pixels PIX are disposed on the first substrate SB1, and color filters and a common electrode are disposed on the second substrate SB2. The color filters correspond to (or overlap with) the pixels PIX, and the common electrode faces the pixel electrodes. In such an embodiment, the display panel DP of FIG. 16 may not include the cavity-defining layer CDL, which is shown in FIG. 3.

The display apparatus 700 includes a gate driver GD, a data driver DD, and a printed circuit board PCB, which are provided to drive the display panel DP. The gate driver GD, the data driver DD and the printed circuit board PCB are substantially the same as the gate driver 200, the data driver 400, and the printed circuit board 300, which are illustrated in FIG. 1.

In such an embodiment, the gate driver GD is disposed on the first substrate SB1 and is connected to the gate lines G1 to Gm. The data driver DD includes a plurality of source driving chips S-IC. The source driving chips S-IC are disposed or mounted on flexible circuit boards FPCB to be connected to the first substrate SB1. The source driving chips S-IC connected to the first substrate SB1 are connected to the data lines D1 to Dn of the first substrate SB1.

A timing controller (not shown) disposed on the printed circuit board PCB outputs a gate control signal, a data control signal, and image data. The gate driver GD receives the gate control signal from the timing controller through a control line CNL and generates a plurality of gate signals in response to the gate control signal. The gate signals are provided to the pixels PIX through the gate lines G1 to Gm.

The data driver DD receives the image data and the data control signal from the timing controller and generates data voltages corresponding to the image data in response to the data control signal. The data voltages are provided to the pixels PIX through the data lines D1 to Dn.

The pixels PIX receive the data voltages in response to the gate signals and display gray scales corresponding to the data voltages. The liquid crystal layers LCY of the pixels PIX may be driven by the gate signals and the data voltages, and light transmittances may be adjusted or controlled by the driven liquid crystal layers LCY, thereby displaying an image.

Figure 18:
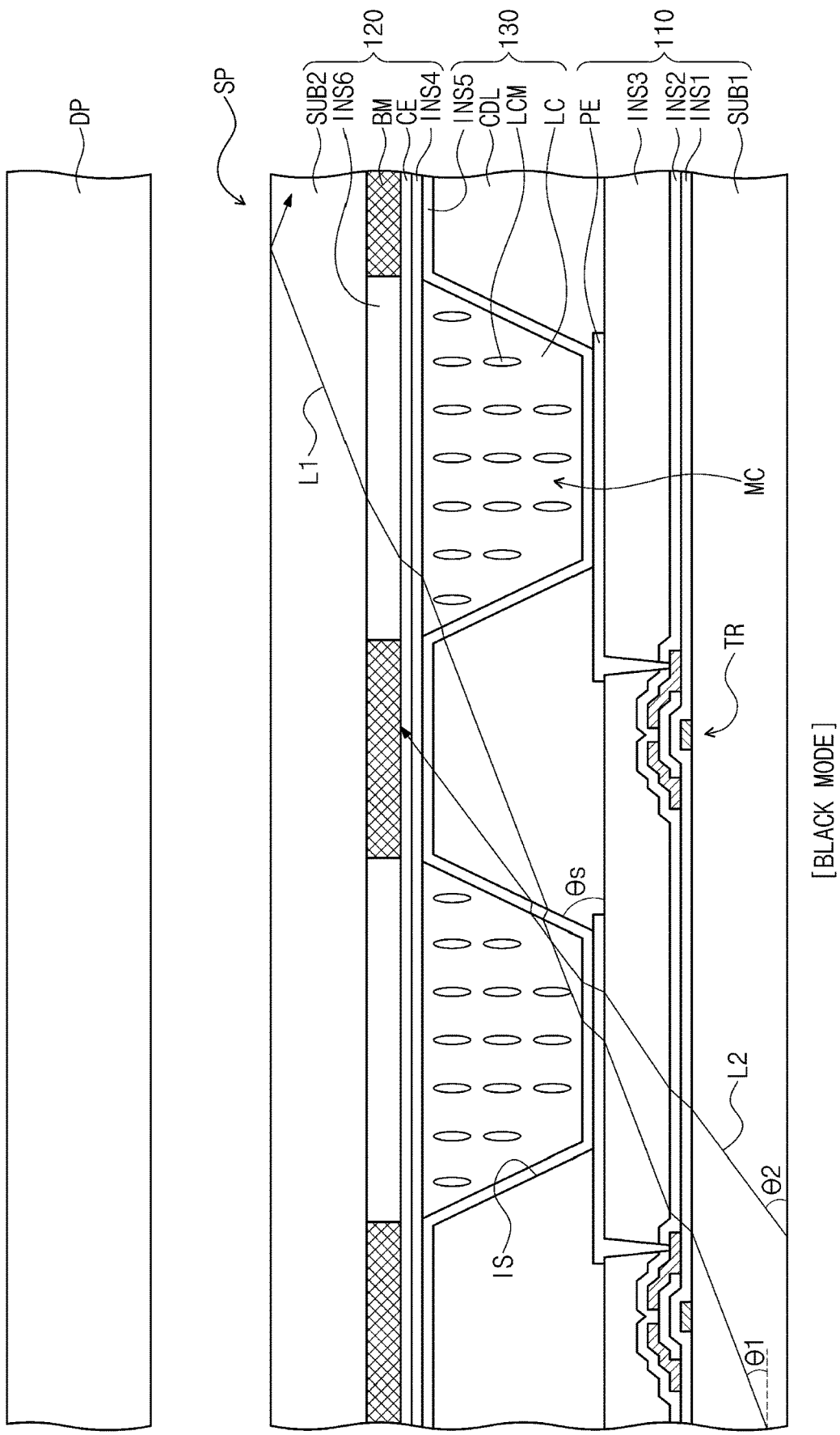
FIG. 18 is a cross-sectional view illustrating the display apparatus of FIG. 16 when the display apparatus operates in a black mode.
Figure 19:
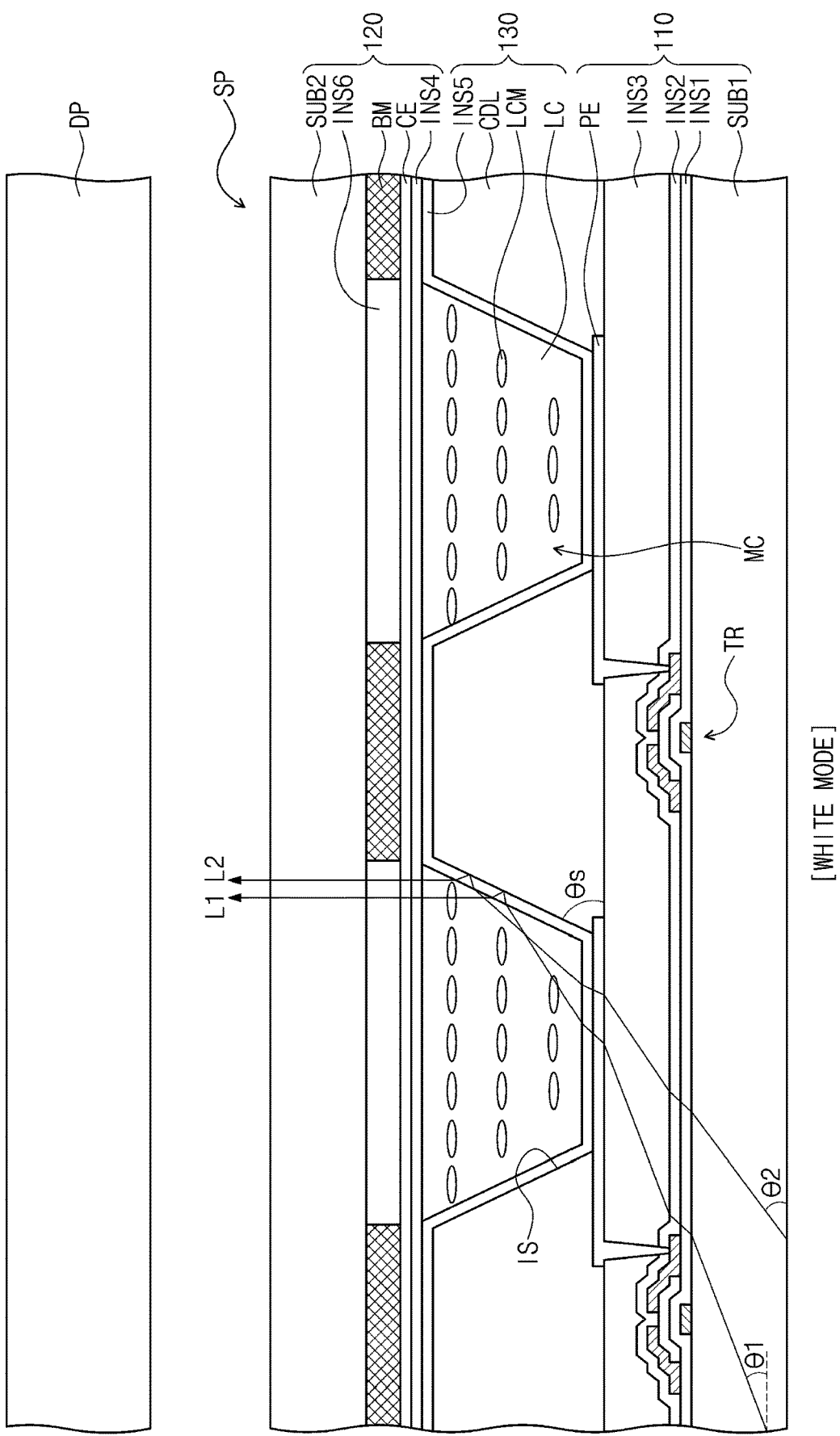
FIG. 19 is a cross-sectional view illustrating the display apparatus of FIG. 16 when the display apparatus operates in a white mode.

FIG. 18 is a cross-sectional view illustrating the display apparatus of FIG. 16 when the display apparatus operates in the black mode. FIG. 19 is a cross-sectional view illustrating the display apparatus of FIG. 16 when the display apparatus operates in the white mode. For the purpose of ease and convenience in description and illumination, FIGS. 18 and 19 shows cross-sectional views corresponding to the cross-sectional view in FIG. 17.

Referring to FIG. 18, the black mode operation of the shutter panel SP illustrated in FIG. 18 is substantially the same as the black mode operation of the display panel 100 illustrated in FIG. 7. When the shutter panel SP operates in the black mode, lights L1 and L2 generated in the shutter panel SP are blocked in the shutter panel SP and are not provided to the display panel DP. Thus, the display apparatus 700 may operate in the black mode.

Referring to FIG. 19, the white mode operation of the shutter panel SP illustrated in FIG. 19 is substantially the same as the white mode operation of the display panel 100 illustrated in FIG. 8. When the shutter panel SP operates in the white mode, the lights L1 and L2 generated in the shutter panel SP pass through the shutter panel SP to be provided to the display panel DP. Thus, the display apparatus 700 may operate in the white mode.

Generally, a contrast ratio is defined as a ratio of the brightest screen to the darkest screen. A color reproduction range may be increased as the contrast ratio increases, and thus a higher quality image may be provided to a user. To increase the contrast ratio, an additional shutter panel (hereinafter, referred to as 'a conventional shutter panel') having a light-shutter function for transmitting (white mode) and blocking (black mode) light generated in a backlight unit may be disposed between a display panel and the backlight unit. A difference in luminance between a bright screen (white mode) and a dark screen (black mode) may be increased by such a conventional shutter panel.

However, such a conventional shutter panel has substantially the same elements as the display panel and is disposed between the backlight unit and the display panel. Light generated in the backlight unit may be condensed while passing through an optical member of the backlight unit and may then be outputted. However, a loss of light may occur when the light passes through the optical member. In addition, a loss of light may additionally occur while the light passes through the conventional shutter panel. Since brightness of the light is reduced by the loss of the light, brightness of an image generated by a display apparatus may be reduced. Furthermore, since the conventional shutter panel is added, a total thickness of the display apparatus may be increased.

According to exemplary embodiments of the invention, as described above with reference to FIGS. 16 to 18, the shutter panel SP of the display apparatus 700 may perform both the function of the backlight unit and the function of the light-shutter. Thus, the shutter panel SP may prevent brightness of the display apparatus 700 from being reduced and may improve a contrast ratio of the display apparatus 700. In such an embodiment, since an additional panel to perform the light-shutter function is not used, a total thickness of the display apparatus 700 may be reduced.

According to some embodiments of the invention, the image may be displayed using the light provided directly to the display panel without using a light guide plate, an optical sheet and a polarizing plate, and thus the light-emitting efficiency of the display apparatus may be improved and the thickness of the display apparatus may be reduced.

While the invention have been described with reference to exemplary embodiments, it will be apparent to those skilled in the art that various changes and modifications may be made without departing from the spirits and scopes of the invention. Therefore, it should be understood that the above embodiments are not limiting, but illustrative. Thus, the scopes of the invention are to be determined by the broadest permissible interpretation of the following claims and their equivalents, and shall not be restricted or limited by the foregoing description.

What is claimed is:

1. A display apparatus comprising:
a first substrate including a plurality of pixel areas and a non-pixel area around the pixel areas;
a cavity-defining layer disposed on the first substrate, wherein the cavity-defining layer defines a plurality of cavities overlapping the pixel areas;
an insulating layer disposed on the pixel areas in the cavities and on an upper surface of the cavity-defining layer not overlapping the cavities, wherein the insulating layer is disposed on a side surface of the cavity-defining layer in the cavities;
a liquid crystal layer disposed on the insulating layer in the cavities and not overlapping any upper surface of the cavity-defining layer; and
a second substrate disposed on the insulating layer to cover the liquid crystal layer,
wherein a refractive index of the liquid crystal layer is equal to a refractive index of the cavity-defining layer when the liquid crystal layer is not driven, and
wherein the refractive index of the liquid crystal layer is greater than the refractive index of the cavity-defining layer when the liquid crystal layer is driven.

2. The display apparatus of claim 1, wherein
the insulating layer comprises an inorganic material, and
the cavity-defining layer comprises an organic material.

3. The display apparatus of claim 1, wherein
the refractive index of the liquid crystal layer is about 1.5 when the liquid crystal layer is not driven, and
the refractive index of the liquid crystal layer is greater than about 1.5 and equal to or smaller than about 1.75 when the liquid crystal layer is driven.

4. The display apparatus of claim 1, wherein the refractive index of the liquid crystal layer and the refractive index of the cavity-defining layer are smaller than a refractive index of the insulating layer.

5. The display apparatus of claim 1, wherein
each of the cavities has a cylindrical shape,
a diameter of each of the cavities becomes progressively greater from a bottom thereof toward a top thereof, and
a cross section of each of the cavities has an inverted trapezoidal shape.

6. The display apparatus of claim 1, wherein an inner side surface of the cavity-defining layer, which defines each of the cavities, is an inclined surface having an inclination angle in a range from about 55 degrees to about 75 degrees with respect to a bottom surface of the first substrate.

7. The display apparatus of claim 6, further comprising:
a light source spaced apart from a side surface of a base substrate of the first substrate by a predetermined distance,
wherein the light source provides light to the side surface of the base substrate of the first substrate.

8. The display apparatus of claim 7, wherein the predetermined distance between the light source and the base substrate of the first substrate is about 5 centimeters.

9. The display apparatus of claim 7, wherein the light emitted from the light source toward the side surface of the base substrate of the first substrate forms an angle in a range from about zero degree to about 48 degrees with respect to a bottom surface of the base substrate of the first substrate.

10. The display apparatus of claim 7, wherein
light traveling in the first substrate at an angle in a range from a first angle to a second angle with respect to the bottom surface of the first substrate passes through the liquid crystal layer and the cavity-defining layer when the liquid crystal layer is not driven, and
the light traveling in the first substrate at the angle in the range from the first angle to the second angle passes through the liquid crystal layer and is totally reflected at the inner side surface of the cavity-defining layer when the liquid crystal layer is driven.

11. The display apparatus of claim 10, wherein
the inclination angle of the inner side surface of the cavity-defining layer is about 55 degrees,
the second angle is greater than the first angle,
the second angle is about 48 degrees, and
the first angle is about 17 degrees.

12. The display apparatus of claim 11, wherein the first angle increases to be greater than about 17 degrees as the inclination angle of the inner side surface of the cavity-defining layer increases to be greater than about 55 degrees.

13. The display apparatus of claim 1, wherein
the first substrate comprises:
a plurality of pixel electrodes corresponding to the pixel areas; and
a plurality of transistors connected to the pixel electrodes, the second substrate comprises:
a common electrode facing the pixel electrodes with the liquid crystal layer interposed therebetween,
the liquid crystal layer includes a plurality of liquid crystal molecules oriented vertically to a bottom surface of the first substrate, and
the liquid crystal molecules are driven from vertical orientation to horizontal orientation when the liquid crystal layer is driven.

14. A display apparatus comprising:
a display panel; and
a shutter panel providing light to the display panel,
wherein the shutter panel comprises:
a first substrate including a plurality of pixel areas and a non-pixel area around the pixel areas;
a light source spaced apart from a side surface of the first substrate by a predetermined distance, wherein the light source provides light to the first substrate;
a cavity-defining layer disposed on the first substrate, wherein the cavity-defining layer defines a plurality of cavities overlapping the pixel areas;

an insulating layer disposed on the pixel areas in the cavities and on an upper surface of the cavity-defining layer not overlapping the cavities, wherein the insulating layer is disposed on a side surface of the cavity-defining layer in the cavities;

a liquid crystal layer disposed on the insulating layer in the cavities and not overlapping any upper surface of the cavity-defining layer; and a second substrate disposed on the insulating layer to cover the liquid crystal layer, wherein a refractive index of the liquid crystal layer is equal to a refractive index of the cavity-defining layer when the liquid crystal layer is not driven, and wherein the refractive index of the liquid crystal layer is greater than the refractive index of the cavity-defining layer when the liquid crystal layer is driven.

15. A method of fabricating a display apparatus, the method comprising:

preparing a first substrate, wherein the first substrate comprises: a plurality of pixel electrodes disposed in a plurality of pixel areas; and a plurality of transistors disposed in a non-pixel area around the pixel areas and connected to the pixel electrodes;

providing a cavity-defining layer on the first substrate, wherein a plurality of cavities overlapping the pixel areas is defined in the cavity-defining layer;

providing an insulating layer on the pixel areas in the cavities and on an upper surface of the cavity-defining layer not overlapping the cavities, wherein the insulating layer is provided on a side surface of the cavity-defining layer in the cavities;

providing a liquid crystal layer on the insulating layer in the cavities and not to overlap any upper surface of the cavity-defining layer; and providing a second substrate on the insulating layer to cover the liquid crystal layer, wherein the second substrate comprises a common electrode facing the pixel electrodes, wherein a refractive index of the liquid crystal layer is equal to a refractive index of the cavity-defining layer when the liquid crystal layer is not driven, and wherein the refractive index of the liquid crystal layer is a greater than the refractive index of the cavity-defining layer when the liquid crystal layer is driven.

16. The method of claim 15, wherein the insulating layer comprises an inorganic material, the cavity-defining layer comprises an organic material, and the refractive index of the liquid crystal layer and the refractive index of the cavity-defining layer are smaller than a refractive index of the insulating layer.

17. The method of claim 15, wherein each of the cavities has a cylindrical shape, a diameter of each of the cavities becomes progressively greater from a bottom thereof toward a top thereof, a cross section of each of the cavities has an inverted trapezoidal shape, and an inner side surface of the cavity-defining layer, which defines each of the cavities, is an inclined surface having an inclination angle in a range from about 55 degrees to about 75 degrees with respect to a bottom surface of the first substrate.

18. The method of claim 17, further comprising:

providing a light source spaced apart from a side surface of a base substrate of the first substrate by a predetermined distance, wherein the light source provides light to the side surface of the base substrate of the first substrate, and wherein the light emitted from the light source toward the side surface of the base substrate the first substrate forms an angle in a range from about zero degree to about 48 degrees with respect to a bottom surface of the base substrate of the first substrate.

19. The method of claim 18, wherein light traveling in the first substrate at an angle in a range from a first angle to a second angle with respect to the bottom surface of the first substrate passes through the liquid crystal layer and the cavity-defining layer when the liquid crystal layer is not driven, the light traveling in the first substrate at the angle in the range from the first angle to the second angle passes through the liquid crystal layer and is totally reflected at the inner side surface of the cavity-defining layer when the liquid crystal layer is driven, the second angle is greater than the first angle, the second angle is about 48 degrees, the first angle is about 17 degrees when the inclination angle of the inner side surface of the cavity-defining layer is about 55 degrees, and the first angle increases to be greater than about 17 degrees as the inclination angle of the inner side surface of the cavity-defining layer increases.

20. A display apparatus comprising:

a first substrate in which a plurality of pixel areas and a non-pixel area around the pixel areas are defined;

a cavity-defining layer disposed on the first substrate, wherein the cavity-defining layer defines a plurality of cavities corresponding to the pixel areas;

a liquid crystal layer disposed in the cavities and not overlapping v upper surface of the cavity-defining layer; and a second substrate disposed on the cavity-defining layer to cover the liquid crystal layer, wherein the liquid crystal layer has a same refractive index as the cavity-defining layer and a refractive index of the first substrate when the liquid crystal layer is not driven, wherein the liquid crystal layer has a greater refractive index than the cavity-defining layer and a refractive index of the first substrate when the liquid crystal layer is driven, wherein each of the cavities has a cylindrical shape, wherein a diameter of each of the cavities becomes progressively greater from a bottom thereof toward a top thereof, wherein a cross section of each of the cavities has an inverted trapezoidal shape, and wherein the cavity-defining layer has the same refractive index as the first substrate.

* * * * *